US010345507B2

(12) United States Patent
Yuki et al.

(10) Patent No.: US 10,345,507 B2
(45) Date of Patent: Jul. 9, 2019

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Mitsuhiro Murata, Sakai (JP); Takeshi Ishida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 72 days.

(21) Appl. No.: 15/522,457

(22) PCT Filed: Oct. 29, 2015

(86) PCT No.: PCT/JP2015/080513
§ 371 (c)(1),
(2) Date: Apr. 27, 2017

(87) PCT Pub. No.: WO2016/072342
PCT Pub. Date: May 12, 2016

(65) Prior Publication Data
US 2017/0336553 A1    Nov. 23, 2017

(30) Foreign Application Priority Data

Nov. 5, 2014   (JP) ................................. 2014-225372

(51) Int. Cl.
*F21V 7/04*      (2006.01)
*F21V 8/00*      (2006.01)
*G02F 1/1335*    (2006.01)

(52) U.S. Cl.
CPC ......... *G02B 6/0045* (2013.01); *G02B 6/0031* (2013.01); *G02B 6/0088* (2013.01); *G02F 1/133615* (2013.01)

(58) Field of Classification Search
CPC .. G02B 6/0045; G02B 6/0031; G02B 6/0088; F21V 2200/40; G02F 1/133615
(Continued)

(56) References Cited

U.S. PATENT DOCUMENTS 5,070,431 A * 12/1991 Kitazawa ............. G02B 6/0021
                                                          362/23.15
2009/0051636 A1    2/2009 Natori

FOREIGN PATENT DOCUMENTS

JP    2007-087724 A    4/2007
JP    2007-087725 A    4/2007
(Continued)

*Primary Examiner* — Matthew J. Peerce
(74) *Attorney, Agent, or Firm* — ScienBiziP, P.C.

(57) ABSTRACT

A lighting device includes a light source emitting light having an orientation distribution around an optical axis, a light guide plate having a hole and including a light entrance surface, a light exit surface, a non-light exit portion, and a light receiving surface, and a reflecting portion. The light entrance surface is opposite the light source such that the optical axis overlaps the hole. The non-light exit portion is the hole and surrounded by the light exit surface. The light receiving surface is next to the light entrance surface and near the non-light exit portion and receives maximum inclination light including light inclined at a largest angle with respect to the optical axis in a plan view. The reflecting portion is arranged opposite the light receiving surface and reflects the maximum inclination light from the light receiving surface toward the non-light exit portion.

7 Claims, 19 Drawing Sheets

(58) Field of Classification Search
USPC .......................................................... 362/611
See application file for complete search history.

(56) References Cited

FOREIGN PATENT DOCUMENTS

JP     2007087724 A  *  4/2007
JP     2009-047902 A     3/2009

* cited by examiner

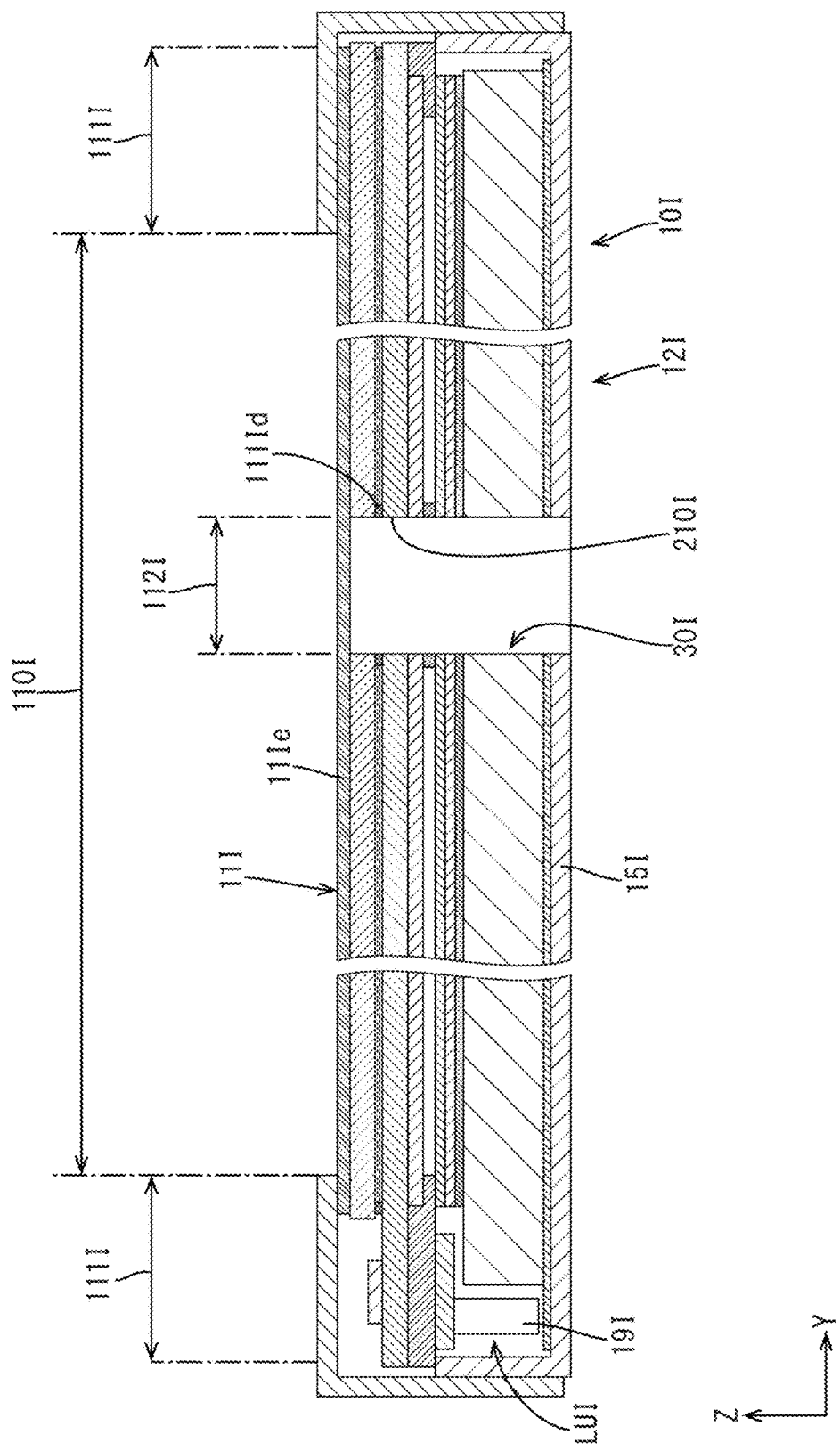

LIGHTING DEVICE AND DISPLAY DEVICE

TECHNICAL FIELD

The present invention relates to a lighting device and a display device.

BACKGROUND ART

Liquid crystal panels have been used as display parts in display devices such as smartphones and tablet computers. Such a liquid crystal panels does not emit light by itself and therefore, uses light from the lighting device (a backlight device). Such a lighting device is arranged on a rear-surface side of the liquid crystal panel and configured to emit planar light spreading over a rear surface of the liquid crystal panel.

An example of the lighting device includes a light guide plate and a light source of light emitting diodes (LEDs) that are arranged opposite an edge surface of the light guide plate. Such a lighting device is a lighting device of an edge light type (or a side light type) and is preferably used to reduce a thickness of the device and consumption of power.

In such an edge-light type lighting device, the edge surface of the light guide plate is a light entrance surface through which light emitted by the LED light source enters the light guide plate and a front-side plate surface of the light guide plate is a light exit surface through which the light entering through the light entrance surface travels exits the light guide panel toward the liquid crystal panel. Light entering the light guide plate through the light entrance surface travels within the light guide plate with being reflected repeatedly and exits the light guide plate through the light exit surface.

According to increased variation of design and usages of display devices, the liquid crystal panel may include a non-display area in the display area and no image is displayed in the non-display area. For example, in the configuration of Patent Document 1, a window portion of a hole is formed through the liquid crystal panel and the lighting device as the non-display area within the display area. Such a window portion is formed to check a rear-surface side of the display device from the front surface (display surface) side.

In the display device including the edge-light type lighting device, a through hole corresponding to the non-display area is formed in the light guide plate of the lighting device to provide the non-display area within the display area of the liquid crystal panel.

RELATED ART DOCUMENT

Patent Document

Patent Document 1: Japanese Unexamined Patent Application Publication No. 2009-47902

Problem to be Solved by the Invention

In a configuration where the above display device includes the non-display area within the display area of the liquid crystal panel, the non-display area is located in front of the LED light source included in the edge-light type lighting device. Namely, the through hole of the light guide plate corresponding to the non-display area is arranged in front of the LED light source. With such a configuration, light enters the light guide plate from the LED light source is blocked by a mounting member mounted in the through hole.

Therefore, a dark portion may be generated in a rear portion of the light guide plate corresponding to the non-display area seen from the LED light source. Light from the LED light source does not reach the dark portion. As a result, unevenness in brightness is caused in light exiting the light guide plate through the light exit surface.

Output from the LED light may be reduced to less occurrence of unevenness in brightness. However, this may lower brightness of light exiting through the light exit surface as a whole.

DISCLOSURE OF THE PRESENT INVENTION

An object of the present invention is to provide an edge-light type lighting device used in a display device that includes a non-display area within a display area and having less occurrence in unevenness in brightness of the display area.

Means for Solving the Problem

A lighting device according to the present invention includes a light source emitting light having an orientation distribution around an optical axis, a light guide plate that is a transparent plate member having a hole being through thickness thereof, and a reflecting portion. The light guide plate includes a light entrance surface, a light exit surface, a non-light exit portion, and a light receiving surface. The light entrance surface is an edge surface of the plate member and opposite the light source such that the optical axis overlaps the hole, and light emitted by the light source enters the light guide plate through the light entrance surface. The light exit surface is a front-side plate surface of the plate member and the light entering through the light entrance surface exits the light guide plate through the light exit surface. The non-light exit portion is the hole and surrounded by the light exit surface. The light receiving surface is a side edge surface of the plate member that is next to the light entrance surface and near the non-light exit portion, and the light receiving surface receives maximum inclination light including light that is inclined at a largest angle with respect to the optical axis in a plan view among rays of light emitted by the light source. The reflecting portion is arranged opposite the light receiving surface and reflects the maximum inclination light from the light receiving surface toward the non-light exit portion.

According to such a configuration of the lighting device, light emitted by the light source is likely to reach a portion of the light guide plate opposite from the light source with respect to the non-light exit portion of the light guide plate, and unevenness in brightness is less likely to occur in the light exiting through the light exit surface.

In the above lighting device, the light receiving surface may be a curved surface of an arc or an elliptical arc that expands outward, and the reflecting portion may have a curved surface following the light receiving surface. According to such a configuration of the light receiving surface and the reflecting portion, compared to a configuration where the light receiving surface and the reflecting portion are flat surfaces, the maximum inclination light emitted by the light source is likely to reflect off the reflecting portion toward the non-light exit portion and the light emitted by the light source (light between the optical axis and the maximum inclination light) is likely to reach a portion of the light guide plate opposite from the light source with respect to the non-light exit portion. As a result, unevenness in brightness of light emitted through the light emitting surface is likely to occur.

In the above lighting device, the hole that is the non-light exit portion may have a center, and the center of the hole may coincide with a center of the light guide plate with respect to a direction of the optical axis of the light source, or the center of the hole may be away from the light entrance surface with respect to the center of the light guide plate. According to such a configuration of the center of the non-light exit portion and the center of the light guide plate, the maximum inclination light emitted by the light source is likely to reflect off the reflecting portion toward the non-light exit portion and the light emitted by the light source (light between the optical axis and the maximum inclination light) is likely to reach a portion of the light guide plate opposite from the light source with respect to the non-light exit portion. As a result, unevenness in brightness of light emitted through the light emitting surface is likely to occur.

In the above lighting device, the light receiving surface may have a light path adjusting portion that reflects the maximum inclination light emitted by the light source toward the non-light exit portion. With the configuration of the light receiving surface including the light path adjusting portion (such as the prism portion), the maximum inclination light emitted by the light source is likely to reflect off the reflecting portion toward the non-light exit portion.

The above lighting device may further include a chassis including a bottom portion where the light guide plate is arranged, and a peripheral wall portion extending from an outer peripheral edge portion of the bottom portion toward a front side and surrounding the light guide plate, and the reflecting portion may be the peripheral wall portion. Thus, the reflecting portion is a part of the peripheral wall portion of the chassis, and the number of unnecessary components is less likely to be increased.

In the above lighting device, the light receiving surface may be a flat surface inclined with respect to the light entrance surface, and the reflecting portion may be a flat surface along the light receiving surface. With such a configuration where the light receiving surface and the reflecting portion are flat surfaces, the inclination angle is adjusted such that the maximum inclination light from the light source reflects off the reflecting portion toward he non-light exit portion.

A display device according to the present technology includes the above lighting device, and a display panel arranged on a light exit side of the lighting device and including a display area displaying images using light from the lighting device and a non-display area where no image is displayed and that is disposed in the display area. Accordingly, the above lighting device may be applied to the display device including the panel having the non-display area within the display area.

Advantageous Effect of the Invention

According to the present invention, an edge-light type lighting device used in a display device including a non-display area within a display area and having less occurrence of unevenness in brightness of the display area is provided.

BRIEF DESCRIPTION OF THE DRAWINGS

FIG. 19 is a cross-sectional view of a liquid crystal display device of a tenth embodiment.

MODES FOR CARRYING OUT THE INVENTION

<First embodiment>

Figure 1:
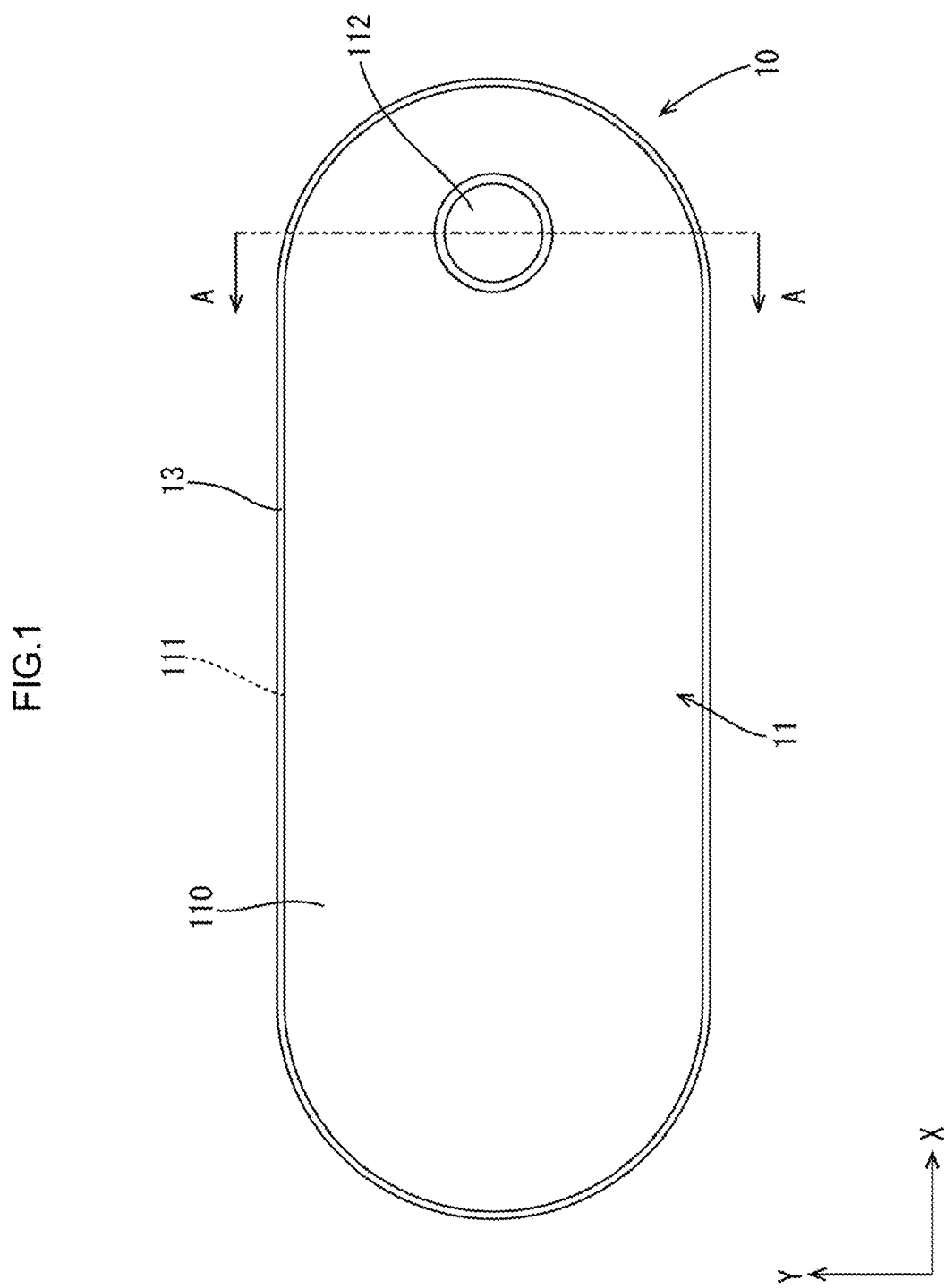
FIG. 1 is a plan view of a liquid crystal display device according to a first embodiment.

A first embodiment of the present invention will be described with reference to FIGS. 1 to 5. In the present embodiment, a liquid crystal display device (a display device) 10 including a lighting device 12 of an edge-light type will be described as an example. X-axis, the Y-axis and the Z-axis may be present in the drawings. An upper side and a lower side in FIG. 2 correspond to a front side (a display surface side) and a back side (a rear surface side) of the liquid crystal display device 10, respectively.

Figure 2:
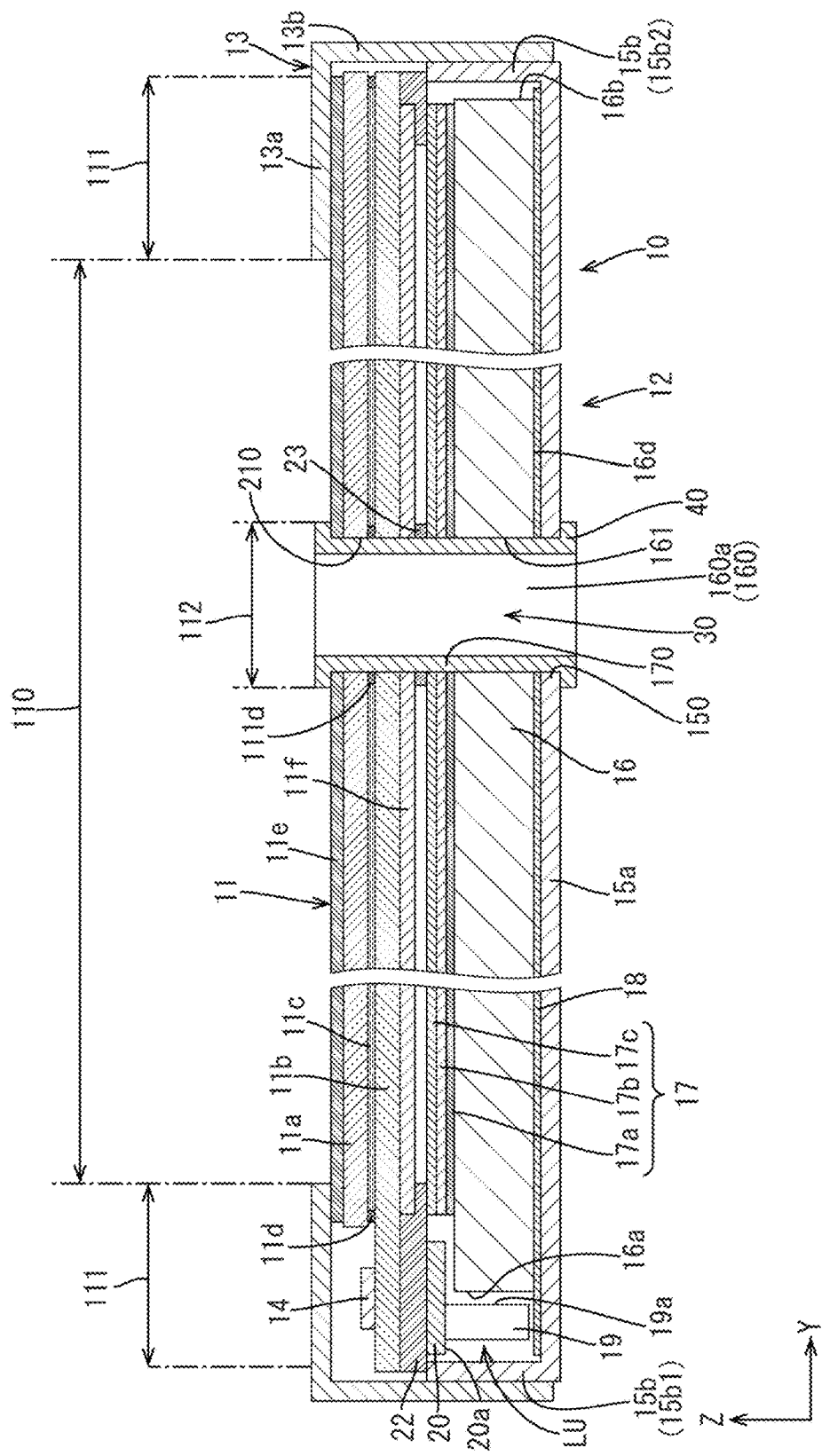
FIG. 2 is a cross-sectional view taken along line A-A in FIG. 1.

FIG. 1 is a plan view of the liquid crystal display device 10 according to the first embodiment. FIG. 2 is a cross-sectional view taken along line A-A in FIG. 1. The liquid crystal display device 10 may be included in an instrument panel of a vehicle and may display various images such as images of meters, map images of car navigation system, and images taken by a built-in camera.

As illustrated in FIG. 1, the liquid crystal display device 10 is elongated in a right-left direction as a whole and has an arched shape on both two ends. In each drawing, a longitudinal direction of the liquid crystal display device 10 matches the X-axis direction, a short direction matches the Y-axis direction, and a thickness direction matches the Z-axis direction. The liquid crystal display device 10 mainly includes a liquid crystal panel 11, an edge-light type lighting device 12, and a bezel 13.

The liquid crystal panel 11 has an elongated plan view shape extending in the right-left direction as a whole and has arched shape at both ends. The liquid crystal panel 11 is substantially transparent and includes a pair of substrates 11a, 11b, and a liquid crystal layer 11c interposed between the substrates 11a, 11b, and an outer periphery sealing member 11d. The substrates 11a, 11b has substantially transparent and has high transmissivity The liquid crystal layer 11c includes liquid crystal molecules having optical characteristics that change according to application of the electric field. The outer periphery sealing member 11d surrounds the liquid crystal layer 11c and is interposed between the substrates 11a, 11b at outer peripheral edge portions thereof to enclose the liquid crystal layer 11c between the substrates 11a, 11b.

The liquid crystal panel 11 includes a display area (an active area) 110 in a middle portion on the front surface, a first non-display area (a non-active area) 111, and a second non-display area 112. Images are displayed in the display area 110. The first non-display area 111 is included in an outer peripheral portion of the front surface to surround the display area 110. The first non-display area 111 is provided in a frame shape and no image is displayed in the first non-display area 111. The second non-display area 112 is included within the display area 110 and included in a circular shape and no image is displayed in the second non-display area 112.

The liquid crystal panel 11 can display images in the display area 110 to be visible using light from the lighting device. Among the substrates 11a, 11b included in the liquid crystal panel 11, a front-side one is a color filter (CF) substrate 11a and a rear-side one is an array substrate 11b. Polarizing plates 11e and 11f are attached to the outer surfaces of the substrates 11a and 11b.

The array substrate 11b is slightly greater than the CF substrate 11a and the array substrate 11b has a short-side dimension greater than that of the CF substrate 11a. One edge portion of the array substrate 11b in the short-side direction projects outwardly from the edge portion of the CF substrate 11a if the substrates 11a, 11b are overlapped with each other. A driver 14 for driving the liquid crystal panel 11 and a flexible board (not illustrated) are mounted on the projected edge portion. The driver 14 is mounted directly on the edge portion with a chip on glass (COG) mounting technology. The driver 13 processes various input signals suppled from a panel driving circuit board (no illustrated) via the flexible board and supplies processed signals to TFTs within the display area 110, which will be described later.

TFTs (thin film transistors), which are switching components, and pixel electrodes are disposed in a matrix on an inner surface side (a liquid crystal layer 11c side, on a side opposite the CF board 11a) with respect to the array board 11b. Gate lines and source lines are routed in a matrix near the TFTs and the pixel electrodes. The gate lines and the source lines receive signals regarding images from a driver 14. The pixel electrode may be a transparent conductive film made of ITO (Indium Oxide Tin), and ZnO (Zinc oxide).

On the inner surface side (the liquid crystal layer 11c side, opposite the array substrate 11b) of the CF substrate 11a, color filters are arranged to overlap each of the pixel electrodes. The color filters includes red (R), green (G), and blue (B) color portions that are arranged alternately. A light blocking layer (a black matrix) is formed between the color portions. Counter electrodes are arranged on surfaces of the color filter and the light blocking layer. The counter electrodes are opposite the pixel electrodes on the array substrate 11b side. The counter electrodes are made of a transparent conductive film similarly to the above described pixel electrode. Alignment films are disposed on the inner surface side of the substrates 11a, 11b to align the liquid crystal molecules included in the liquid crystal layer.

The liquid crystal panel 11 has a panel hole 210 in a portion overlapping the second non-display area 112. The panel hole 210 is through the thickness of the panel 11. The liquid crystal layer 11c surrounding the panel hole 210 is sealed therein with a ring-shaped inner periphery sealing member 111d.

The bezel 13 is formed in a frame shape extending along an outer peripheral edge portion of the liquid crystal panel 11 and is made of metal such as aluminum. The bezel 13 includes a pressing portion 13a and a peripheral wall portion 13b. The pressing portion 13a presses the first non-display area 111 that is in the outer peripheral edge portion of the liquid crystal panel 11 over an entire periphery from the front side. The peripheral wall portion 13b extends downwardly from the outer peripheral edge portion of the pressing portion 13a and surrounds the lighting device 12. The liquid crystal panel 11 is held between the bezel 13 and the lighting device 12. A double-sided adhesive tape 22 is between the liquid crystal panel 11 and the lighting device 12 and the liquid crystal panel 11 and the lighting device 12 are fixed to each other via the double-sided adhesive tape 22. The double-sided adhesive tape 22 has light blocking properties and light leaking from the lighting device 12 is less likely to pass through the first non-display area 111.

The light exiting the lighting device 12 toward the rear surface of the liquid crystal panel 11 and visible images are displayed in the display area 110 of the liquid crystal panel 11. The lighting device 12 is an edge-light type and includes a chassis 15, an LED unit LU, a light guide plate 16, an optical sheet 17, and a reflection sheet 18.

The chassis 15 has a substantially shallow box shape that is open toward the front side (the liquid crystal panel 11) and the LED unit LU and the light guide plate 16 are arranged in the chassis 15. The chassis 15 is made of metal material such as aluminum or resin material. The chassis 15 includes a plate bottom portion 15a and plate peripheral wall portion 15b. The bottom portion 15a has a similar plan view shape as the liquid crystal panel 11. The peripheral wall portion 15b extends from the outer peripheral edge portion of the bottom portion 15a toward the front side and surrounds the light guide plate 16.

The bottom portion 15a has an elongated shape extending in a right-left direction as a whole and has arched edge portions on both ends in a plan view similarly to the liquid crystal panel 11. The bottom portion 15a has a chassis hole 150 in a portion overlapping the second non-display area of the liquid crystal panel 11. The chassis hole 150 is through a thickness of the bottom portion 15a.

A reflection sheet 18 having a similar shape as that of the liquid crystal panel 11 is disposed on a front surface of the bottom portion 15a. The reflection sheet 18 is a white foamed plastic sheet (foamed polyethylene terephthalate). The reflection sheet 18 has a round reflection sheet hole 180 in a portion overlapping the second non-display area 112 of the liquid crystal panel 11. The reflection sheet hole 180 is through a thickness of the reflection sheet 18.

The peripheral wall portion 13b of the bezel 13 is arranged outside the peripheral wall portion 15b. The peripheral wall portion 15b of the chassis 15 and the peripheral wall portion 13b of the bezel 13 are fixed to each other via a fixing configuration (not illustrated). The peripheral wall portion 15b is adhered on a rear-side adhesive surface of the double-sided adhesive tape 22 at a distal end portion thereof.

The peripheral wall portion 15b includes a first peripheral wall portion 15b1, a second peripheral wall portion 15b2, a third peripheral wall portion 15b3, and a fourth peripheral wall portion (not illustrated). The first and second peripheral wall portions 15b1, 15b2 are linearly extend in the right-left long-side direction in a plan view. The third and fourth peripheral wall portions 15b3 have an arched shape on the short sides to expand outwardly.

The LED unit LU includes the LEDs 19 and an LED board 20 where the LEDs 19 are mounted. Each of the LEDs 19 is configured by enclosing an LED chip (an LED component) that is a semiconductor light emitting component with resin material. The LEDs 19 are side-surface emitting type and include light emitting surfaces 19a that are vertical to a mounting surface 20a of the LED board 20 where the LEDs 19 are mounted. The light emitting surfaces 19a are opposite an edge surface of the light guide plate 16 (a light entrance surface) 16a with a certain clearance therebetween. The LEDs 19 are arranged in a line on the LED board 20. The LEDs 19 are arranged at an interval and opposite the light entrance surface 16a. The mounting surface 20a of the LED board 20 is covered with an insulating light reflecting film. As illustrated in FIG. 2, the LEDs 19 that are mounted on the LED board 20 are disposed between the peripheral wall portion 15a of the chassis 15 and the light entrance surface 16a of the light guide plate 16.

The light emitting surfaces 19a of the LEDs 19 are disposed between the mounting surface 20a of the LED board 20 and the reflection sheet 18 on the bottom portion 15a of the chassis 15 with respect to a front-rear direction of the liquid crystal display device 10. The mounting surface 20a and the reflection sheet 18 are arranged to sandwich the clearance between the light emitting surface 19a and the edge surface of the light guide plate 16 (the light entrance surface) 16a with respect to the front-rear direction.

The LED board 20 is a flexible band-like (elongated) member extending in a long-side direction of the liquid crystal panel 11. The LED board 20 is fixed to the liquid crystal panel 11 such that the mounting surface 19a where the LEDs 19a are mounted is opposite the bottom portion 15a of the chassis 15. The LED board 20 is fixed to the outer peripheral edge portion of the liquid crystal panel 11 (the outer peripheral edge portion of the array substrate 11b) via the double-sided adhesive tape 22. The LED board 20 has a trace pattern (not illustrated) made of a metal film such as copper foil and the LEDs 19 mounted on the mounting surface 19a are connected in series via the trace pattern. The trace pattern is electrically connected to an LED driving circuit board (not illustrated) and driving power supplied from the LED driving circuit board is supplied to each LED 19 via the trace pattern and light is emitted by each LED 19.

Figure 3:
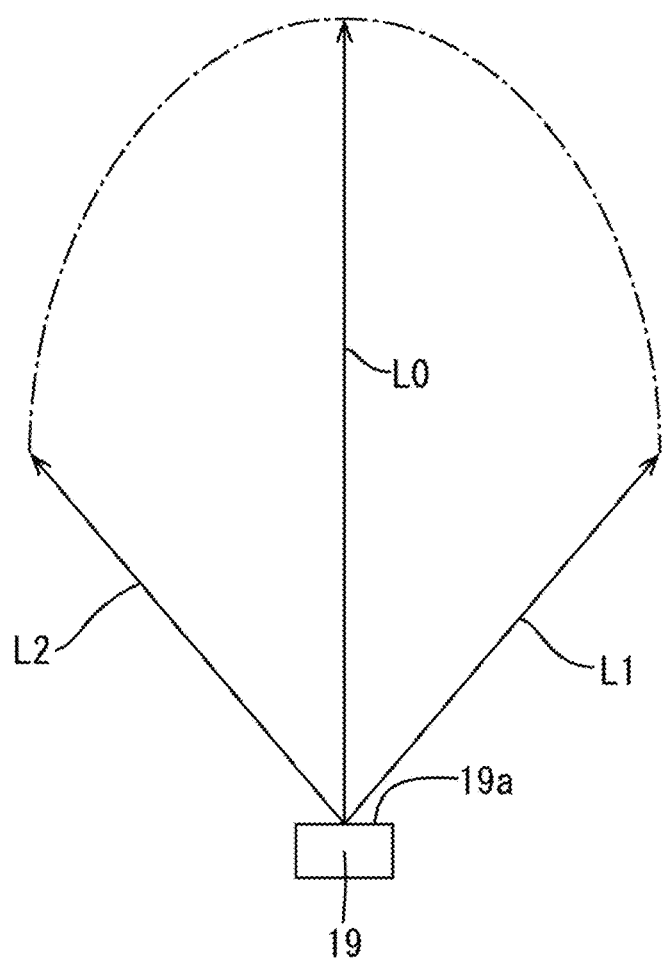
FIG. 3 is a typical view illustrating a two-dimensional orientation distribution of light emitted by the LED through a light emitting surface.

FIG. 3 is a typical view illustrating a two-dimensional orientation distribution of light emitted by the LED 19 through a light emitting surface 19a. FIG. 3 illustrates a plan view of the LED 19 seen from the front side of the liquid crystal display device 10. Light emitted by the LED 19 through the light emitting surface 19a actually has a three-dimensional orientation distribution such that the light spreads three-dimensionally around the optical axis L0. However, in the specification, it is considered that the light has a two-dimensional orientation distribution as is illustrated in FIG. 3.

As described before, the LEDs 19 used in the lighting device 12 are arranged such that the light emitting surfaces 19a are between the reflection sheet 18 and the mounting surface 20a covered that is with a light reflecting film with respect to a front-rear direction of the liquid crystal display device 10. The light entrance surface 16a of the light guide plate 16 opposite the light emitting surfaces 19a of the LEDs 19 are also between the mounting surface 20a and the reflecting sheet 18. A clearance between the light emitting surface 19a and the light entrance surface 16a is quite small and the light emitting surface 19a is very close to the light entrance surface 16a. Therefore, most of the rays of light emitted by the LEDs 19 through the light emitting surface 19a enters the light guide plate 16 through the light entrance surface 16a. The light entering the light guide plate 16 through the light entrance surface 16a and travelling within the light guide plate 16 has the two-dimensional orientation distribution as illustrated in FIG. 3.

Among the rays of light emitted through the light emitting surface 19a, most of the rays of light leaking through a gap formed with respect to the front-rear direction is reflected by the mounting surface 20a and the reflection sheet 18 toward the light entrance surface 16a. Therefore, the light emitted by the LEDs 19 through the light emitting surfaces 19a can be approximated as the light having the two-dimensional orientation distribution illustrated in FIG. 3.

The optical axis L0 of each LED 19 is at a center of the light emitting surface 19a. Rays of light emitted by the LED 19 through the light emitting surface 19a are symmetric about the optical axis L0. In the present embodiment, light L1 is farthest to the right from the optical axis L0 and light L2 is farthest to the left from the optical axis L0. The light L1 is inclined with respect to the optical axis L0 at an angle of 45° to 60°.

The light guide plate 16 has an elongated plan view shape extending in the right-left direction and has arched shape at both ends similar to the liquid crystal panel 11. The light guide plate 16 is a plate member having a certain thickness and made of transparent resin such as polycarbonate. The light guide plate 16 is smaller than the bottom portion 15a of the chassis 15 and is placed on the bottom portion 15a via the reflection sheet 18. The light guide plate 16 has a hole 160 that is through a thickness thereof The light guide plate 16 has a cylindrical peripheral wall surface 161 in the hole 160 and the hole 160 is a round hole.

The light guide plate 16 has a long-side edge surface 16a that is opposite the light emitting surfaces 19a of the LEDs 19 and is the light entrance surface 16a through which the light emitted through the light emitting surface 19a enters the light guide plate 16. The light entrance surface 16a is opposite the peripheral wall portion 15b (the first peripheral wall portion 15b1) of the chassis 15 with the LEDs 19 disposed therebetween. The light guide plate 16 has another long-side edge surface 16b that is opposite the peripheral wall portion 15b (the second peripheral wall portion 15b2) of the chassis 15.

The light guide plate 16 has a front-side plate surface 16c that is a light exit surface 16c through which the light entering the light guide plate 16 through the light entrance surface 16a exits toward the liquid crystal panel 11. The hole 160 is formed in the light exit surface 16c and the light exit surface 16c has a front-side opening edge of the hole 160. Unlike the light exit surface 16c, the light does not exit through the hole 160 toward the liquid crystal panel 11. Therefore, the hole 160 is a non-light exit portion 160a through which light does not exit.

The light guide plate 16 is adhered onto the reflection sheet 18 with a rear-side plate surface 16d. A light extraction pattern including embosses is formed on the rear-side plate surface 16d of the light guide plate 16.

The light guide plate 16 has short-side edge surfaces that are arched curved surfaces to expand outwardly. One of the side edge surfaces on the right side in FIG. 1 is a side edge surface 16e that is arranged near the non-light exit portion 160a (the hole 160). The third peripheral wall portion 15b3 that is a part of the peripheral wall portion 15b of the chassis and has an arched shape is arranged outside the side edge surface 16e. The third peripheral wall portion 15b follows and covers the arched side edge surface 16e. Another one of the side edge surfaces (not illustrated) is on the left side in FIG. 1 and is covered by the fourth peripheral wall portion (not illustrated) from outside. The fourth peripheral wall portion is a part of the peripheral wall portion 15b of the chassis 15. The side edge surface 16e of the light guide plate 16 is a circular arc shape.

The light emitted by the LEDs 19 through the light emitting surfaces 19a enters the light guide plate 16 through the light entrance surface 16a. The light entering the light guide plate 16 travels within the light guide plate 16 with repeating the reflection between the front side surface and the rear side surface. Then, the light exits the light guide plate 16 through the light exit surface 16c toward the liquid crystal panel 11 in a form of planar light. The reflection sheet 18 arranged on the rear plate surface (the rear surface) 16d of the light guide plate 16 reflects the light exiting the light guide plate through the rear surface 16d to the outside back into the light guide plate 16 again and toward the light exit surface 16a.

The optical sheet 17 has a plan view shape similar to that of the light guide plate 16 and layered on the light guide plate 16 to cover the light exit surface 16c. The optical sheet 17 covers the light exit surface 16c and the non-light exit portion 160a that is the hole 160. The optical sheet 17 is arranged in the chassis 15 and between the light guide plate 16 and the liquid crystal panel 11. The optical sheet 17 passes light exiting through the light exit surface 16c toward the rear surface of the liquid crystal panel 11 while adding a specific optical property to the light.

The optical sheet 17 includes multiple (three, in the present embodiment) sheet-like members that are layered on each other. The sheet-like members included in the optical sheet 17 include a diffuser sheet 17a, a lens sheet 17b, and a reflection-type polarizing sheet 17c, and the optical sheets are preferably selected. The light exiting the light guide plate 16 through the light exit surface 16c passes through the optical sheet 17 to obtain evenly planar light.

The optical sheet 17 has a circular optical sheet hole 170 that is through a thickness thereof in a position overlapping the second non-display area 112 of the liquid crystal panel 11 (and the non-light exit portion 160a). The optical sheet 17 is fixed to the liquid crystal panel 11 at an outer peripheral edge portion thereof via the double-sided adhesive tape 22. A ring-shaped double-sided adhesive tape 23 is adhered on the optical sheet 17 around the optical sheet hole 170. The double-sided adhesive tape 23 is also adhered on the liquid crystal panel 11 around the panel hole 210. The double-sided adhesive tape 23 is sandwiched between the optical sheet 17 and the liquid crystal panel 11 and fixes them.

The liquid crystal display device 10 including the above configuration has a hole 30 in a position overlapping the non-display area 112 of the liquid crystal panel 11. The hole 30 is through a thickness of the device. The hole 30 is formed by connecting the panel hole 210 of the liquid crystal panel 11, the optical sheet hole 170 of the optical sheet 17, the hole 160 of the light guide plate 16, the reflection sheet hole 180 of the reflection sheet 18, and the chassis hole 150 of the chassis 15.

A circular cylindrical mount member 40 is inserted into the hole 30. The mount member 40 receives another member (not illustrated) therein.

In the above liquid crystal display device 10, the LEDs 19 of the LED unit LU included in the lighting device 12 emit light (are lighted on) to display images in the display area 110 of the liquid crystal panel 11. The light emitted by the LEDs 19 enters the light guide plate 16 through the light entrance surface 16a. The light entering the light guide plate 16 is reflected by the reflection sheet 18 disposed on the rear side-surface of the light guide plate 16 and a reflection pattern (not illustrated) formed on the rear surface 16d of the light guide plate 16. Thus, the light travels within the light guide plate 16 and exits the light guide plate 16 through the light exit surface 16c that is the front-side plate surface of the light guide plate 16. The light does not exit through the non-light exit portion 160a that is the hole 160 formed in the light guide plate 16. The light exiting through the light exit surface 16c passes the optical sheet 17 and exits the optical sheet 17 in a form of planar light and reaches the rear surface of the liquid crystal panel 11. Then, the liquid crystal panel 11 displays visible images in the display area 110 using the light from the lighting device 12.

Figure 4:
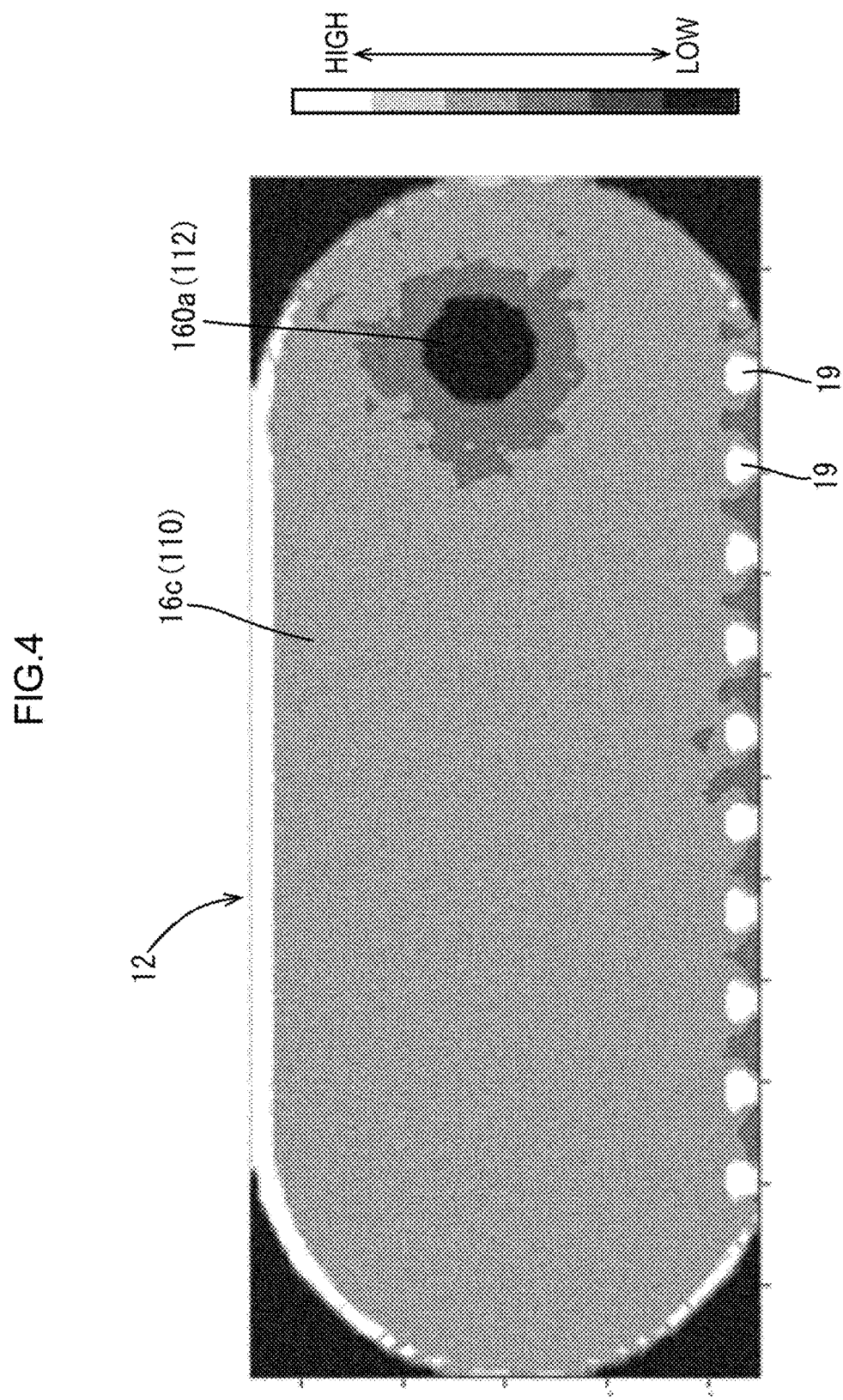
FIG. 4 is a typical view illustrating a brightness distribution of light exiting the lighting device.

FIG. 4 is a typical view illustrating a brightness distribution of light exiting the lighting device 12. FIG. 4 illustrates a brightness distribution of light exiting through the light exit surface 16c overlapping the display area 110 of the lighting device 12 included in the liquid crystal display device 10. As illustrated in FIG. 4, the brightness of light exiting through the light exiting surface 16c overlapping the display area 110 of the lighting device 12 is substantially even. In a portion around the non-light exit portion 160a overlapping the non-display area 112, brightness is slightly lower than that of other portion. However, unevenness in brightness (difference in brightness) is less likely to occur.

Figure 5:
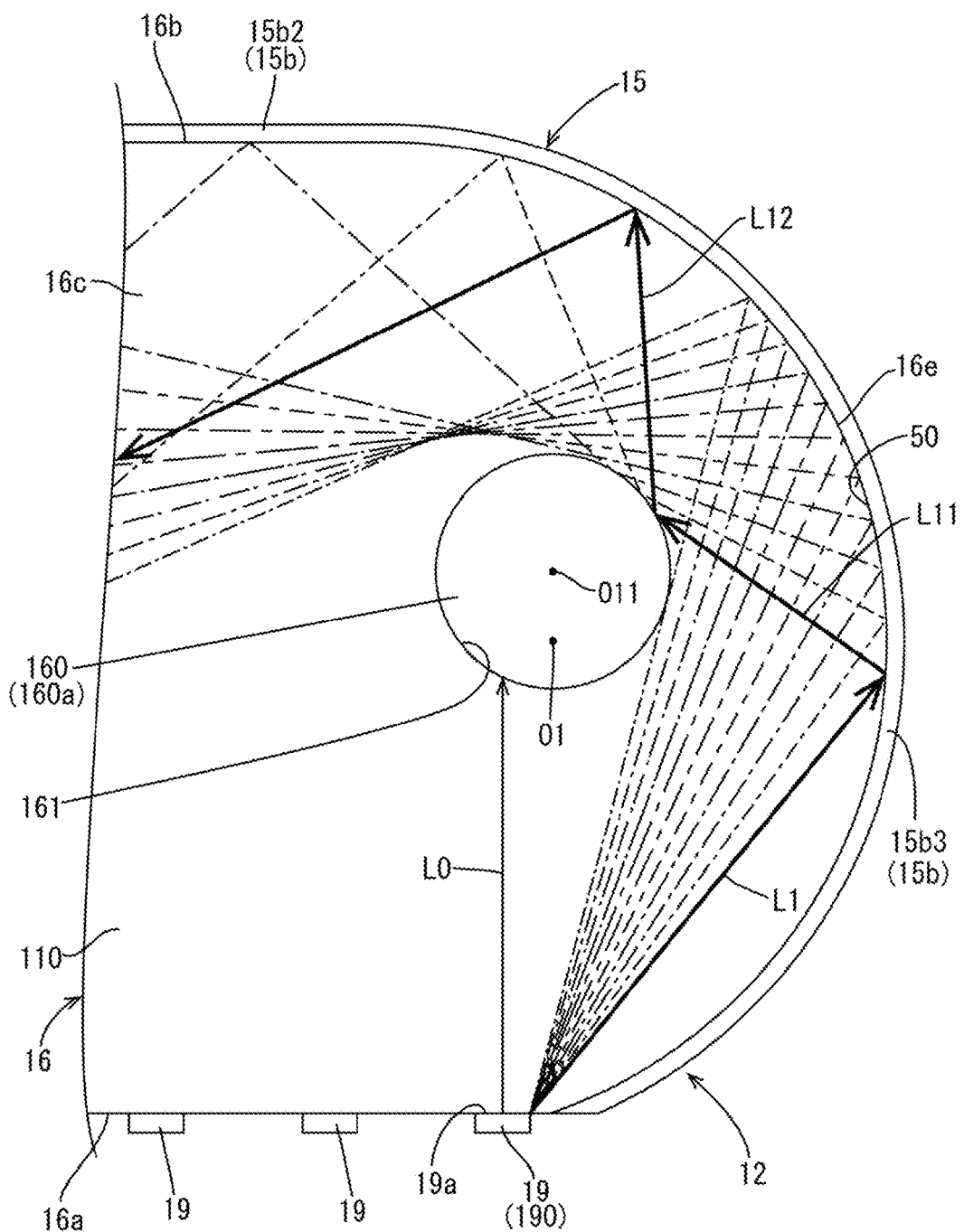
FIG. 5 is a plan view of a part of the lighting device illustrating that light emitted by a LED opposite a non-light exit portion travels within the light guide plate.

In the lighting device 12 included in the liquid crystal display device 10 of the present embodiment, unevenness in brightness is less likely to occur and the principle thereof will be described with reference to FIG. 5. FIG. 5 is a plan view of a part of the lighting device 12 illustrating that light emitted by the LED 19 opposite the non-light exit portion 160a travels within the light guide plate 16.

As illustrated in FIG. 5, among the LEDs 19 included in the LED unit LU, the LED 19 (hereinafter, referred to as an LED 190) on the rightmost side (closest to the non-light exit portion 160a) is arranged opposite the non-light exit portion 160a of the light guide plate 16 with respect to the short-side direction. The LED 190 is arranged such that the optical axis L0 thereof crosses or overlaps the non-light exit portion 160a (the hole 160) of the light guide plate 16. In other words, the LED 190 is positioned (with respect to the non-light exit portion 160a) such that the non-light exit portion 160a (the hole 160) is arranged in the optical axis L0 direction from the LED 190. In FIG. 5, the rays of light emitted by the LED 190 are typically represented by dot-and-dash lines.

Further, the LED 190 is positioned with respect to the non-light exit portion 160a such that light emitted by the LED 190 through the light emitting surface 19a travels as follows. Among the rays of light emitted by the LED 190 through the light emitting surface 19a, the rightmost side (the side edge surface 16e side, the third peripheral wall portion 15b3 side) one L1 of the rays with respect to the optical axis L0 (hereinafter, referred to as maximum inclination light) travels within the light guide plate 16 toward the right side edge surface (a light receiving surface) 16e of the light guide plate 16. The light L1 reflects off an inner wall surface (a reflection portion) 50 of the third peripheral wall portion 15b3 of the chassis 15 that is disposed outside the side edge surface 16e. The reflected light L11 travels toward the non-light exit portion 160a.

The maximum inclination light L1 travels toward the right side edge surface (the light receiving surface) 16e of the light guide plate 16 that is near the non-light exit portion 160a. Among the rays of light reaching the side edge surface (the light receiving surface) 16e, some of the rays reflect off the side edge surface (the light receiving surface) 16e, and some of the rays pass through the side edge surface (the light receiving surface) 16e and reflects off the inner wall surface (the reflecting portion) 50 of the third peripheral wall portion 15b3 of the chassis 15 and returns into the light guide plate 16 again. Therefore, the reflected light L11 of the maximum inclination light L1 includes the light reflecting off the side edge surface (the light receiving surface) 16e and the light reflecting off the inner wall surface (the reflecting portion) 50 of the chassis 15. The reflected light L11 reflects off a peripheral wall surface 161 of the hole 160 of the non-light exit portion 160a and reflected light L12 reflects off a peripheral wall portion 15b2 of the chassis 15.

The position of the LED 190 is determined as described above, and the light emitted by the LED 190 is likely to reach the portion of the light guide plate 16 opposite from the LED 190 with respect to the non-light exit portion 160a overlapping the non-display area 112. With the configuration where the optical axis L0 of the light from the LED 190, the emission direction of the maximum inclination light L1, and the positions of the non-light exit portion 160a and the inner wall surface (the reflecting portion) 50 are set as described above, the light from the LED 190 travels as follows. Among the rays of light emitted by the LED 190, the rays of light between the optical axis L0 and the maximum inclination light L1 travel toward the inner wall surface 50 of the third peripheral wall portion 15b3 and reflect off the inner wall surface 50 (the reflecting portion). Thus, the reflected light is likely to reach the portion of the light guide plate 16 opposite from the LED 190 with respect to the non-light exit portion 160a.

In the present embodiment, the chassis 15 is made of metal and the inner wall surface 50 of the third peripheral wall portion 15b3 is a mirror surface. A center O11 of the hole 160 of the light guide plate 16 is closer to the edge surface 16b than a center position O1 of the short side of the light guide plate 16 (with respect to the optical axis L0 direction of the LED 190). The arched side edge surface (the light receiving surface) 16e of the light guide plate 16 and the inner wall surface 50 of the arched third peripheral wall portion 15b3 that is arranged outside the side edge surface 16e have a shape (curvature) such that the reflected light L11 of the maximum inclination light L1 travels toward the non-light exit portion 160a (the hole 160), as described above.

Light emitted by the LED 19 on the left side of the LED 190 also reaches the portion of the light guide plate 16 opposite from the LED 190 with respect to the non-light exit portion 160a. The light emitted by the LED 190 that has the optical axis L0 overlapping the non-light exit portion 160a and that is closest to the side edge surface (the right receiving surface) 15e and the third peripheral wall portion 15b3 (the inner wall surface 50) that are near the non-light exit portion 160a surely reaches the portion of the light guide plate 16 opposite from the LED 190 with respect to the non-light exit portion 160a. Therefore, a dark portion (opposite from the LED 190 with respect to the non-light exit portion 160a) is less likely to be generated on the light exit surface 16c of the lighting device 12 and unevenness in brightness is less likely to occur in the exit light.

<Comparative Example>

A lighting device 12P according to a comparative example of the present invention will be described with reference to FIGS. 6 and 7. In the lighting device 12P of the comparative example, a configuration similar to that of the first embodiment, the same symbols or numbers are applied to components of the configuration and "P" is added thereto.

Figure 6:
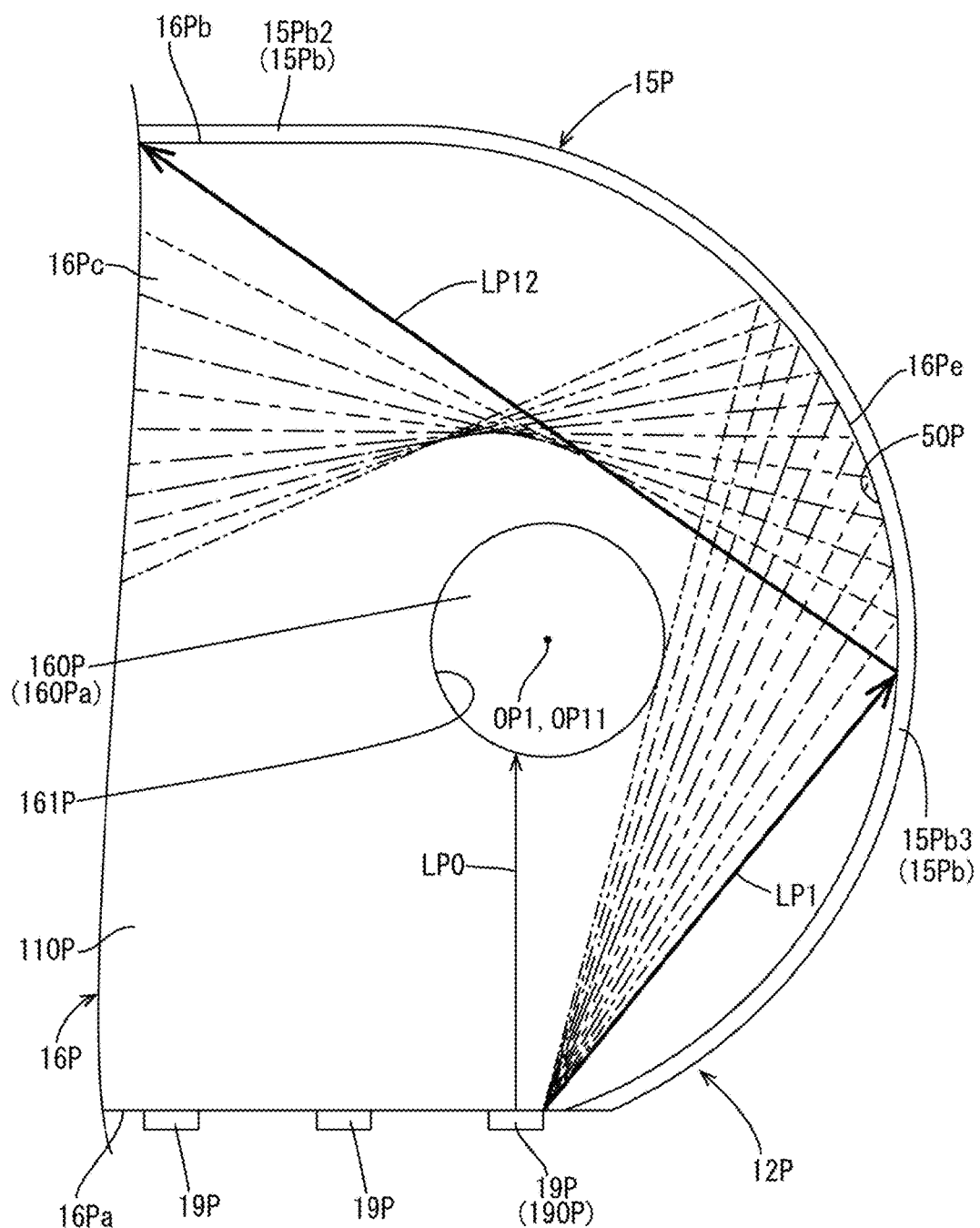
FIG. 6 is a plan view of a part of the lighting device according to a comparative example illustrating that light emitted by a LED opposite a non-light exit portion travels within the light guide plate.

FIG. 6 is a plan view of a part of the lighting device 12P according to the comparative example illustrating that light emitted by a LED 190P opposite a non-light exit portion 160Pa travels within the light guide plate 16P. FIG. 7 is a view typically illustrating a brightness distribution of light exiting the lighting device 121 of the comparative example.

In the lighting device 12P, a hole 160P that is the non-light exit portion 160Pa is formed in the light guide plate 16P closer to the light entrance surface 16Pa than that of the first embodiment. In the comparative example, a center OP11 of the circular hole 160P coincides with a center position OP1 of the short side of the light guide plate 16P (with respect to the optical axis LP0 direction of the LED 190P). The configurations of the lighting device 12P other than the above configuration are similar to those of the first embodiment.

In the lighting device 12P, among the LEDs 19P arranged in a line, a rightmost LED 190P has an optical axis LP0 that overlaps the non-light exit portion 160Pa. Maximum inclination light LP1 of rays of light from the LED 190P reflects off a side edge surface 16Pe of the light guide plate 16P or a third peripheral wall portion 15Pb3 (an inner wall surface 50P) of a chassis 15P and reflected light LP12 does not travels toward the non-light exit portion 160Pa but travels directly toward a second peripheral wall portion 15Pb2 of the chassis 15P that is on an opposite side from the LED 190P with respect to the non-light exit portion 160Pa. Accordingly, rays of light between the optical axis LP0 of the LED 190P and the maximum inclination light LP1 do not travel toward the non-light exit portion 160Pa but travel toward the peripheral wall portion 15Pb such as the second peripheral wall portion 15Pb2. In FIG. 7, the rays of light emitted by the LED 190P are typically illustrated by dot-and-dash lines.

In the configuration where the LED 190P (the non-light exit portion 160Pa) is positioned as described above, the light emitted by the LED 190P is less likely to reach the portion of the light guide plate 16P opposite from the LED 190P with respect to the non-light exit portion 160Pa of the light guide plate 16P that corresponds to the non-display area 112P. Therefore, a dark portion is likely to be generated on a light exit surface 16Pc of the lighting device 12P corresponding to the position of the light guide plate 16 opposite from the LED 190P with respect to the non-light exit portion 160Pa, and unevenness in brightness is likely to occur in the exit light.

Figure 7:
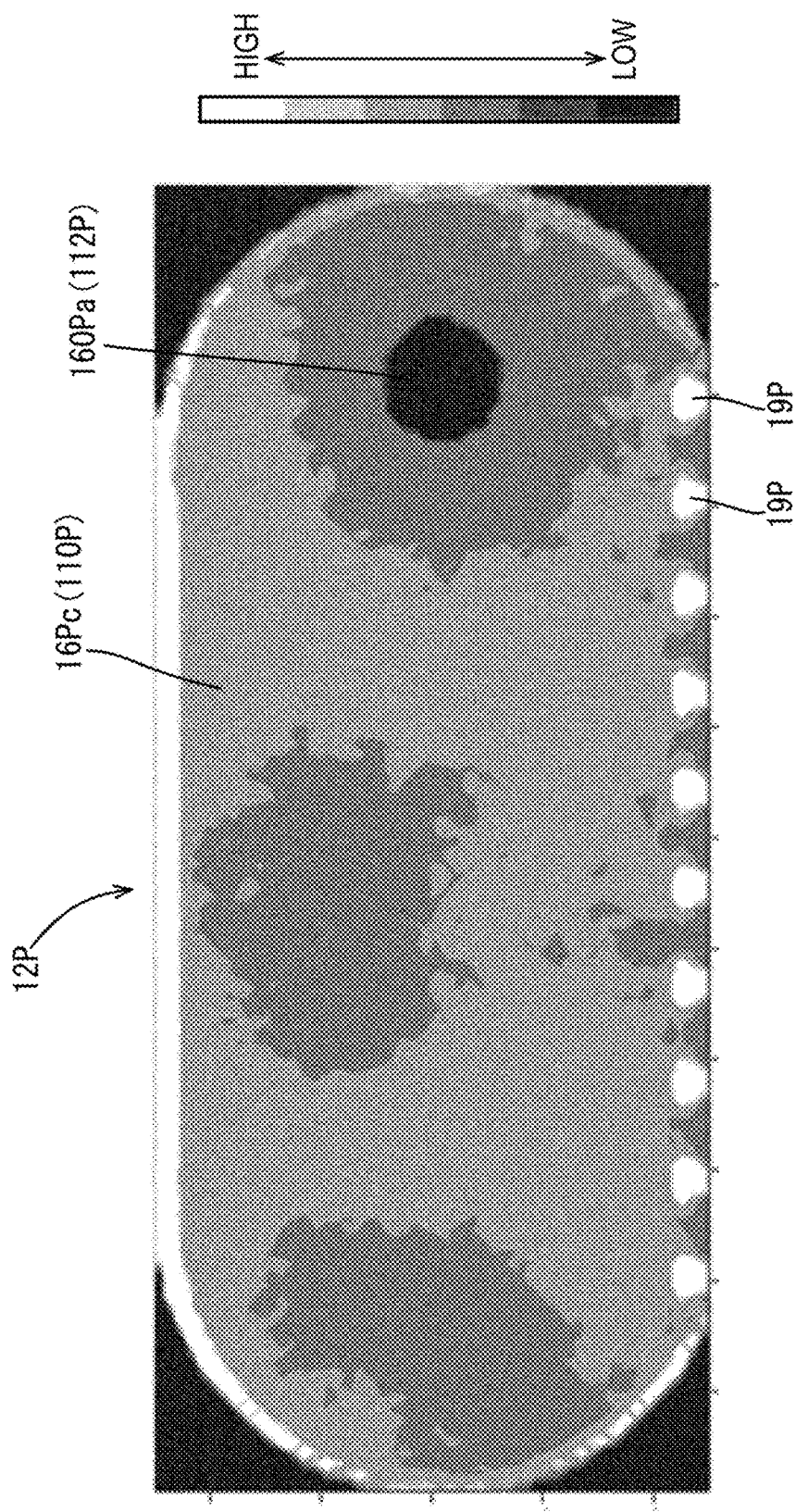
FIG. 7 is a view typically illustrating a brightness distribution of light exiting the lighting device of a comparative example.

FIG. 7 illustrates a brightness distribution of exit light from the lighting device 12P where brightness is lowered as a whole than that in the first embodiment. As illustrated in FIG. 7, the light guide plate 160P includes a portion around the non-light exit portion 160Pa having lower brightness than that of the first embodiment. Since the brightness is lowered as a whole than that in the first embodiment, the light guide plate 160P includes portions having relatively lower brightness other than the vicinity of the non-light exit portion 160Pa. Thus, it is confirmed that the uneven brightness occurs in the lighting device 12P of the comparative example.

<Second Embodiment>

Next, a lighting device 12A of a second embodiment will be described with reference to FIGS. 8 and 9. In the lighting device 12A of the second embodiment, same symbols or numbers as the first embodiment are applied to parts same as those in the first embodiment and "A" is further added thereto.

Figure 8:
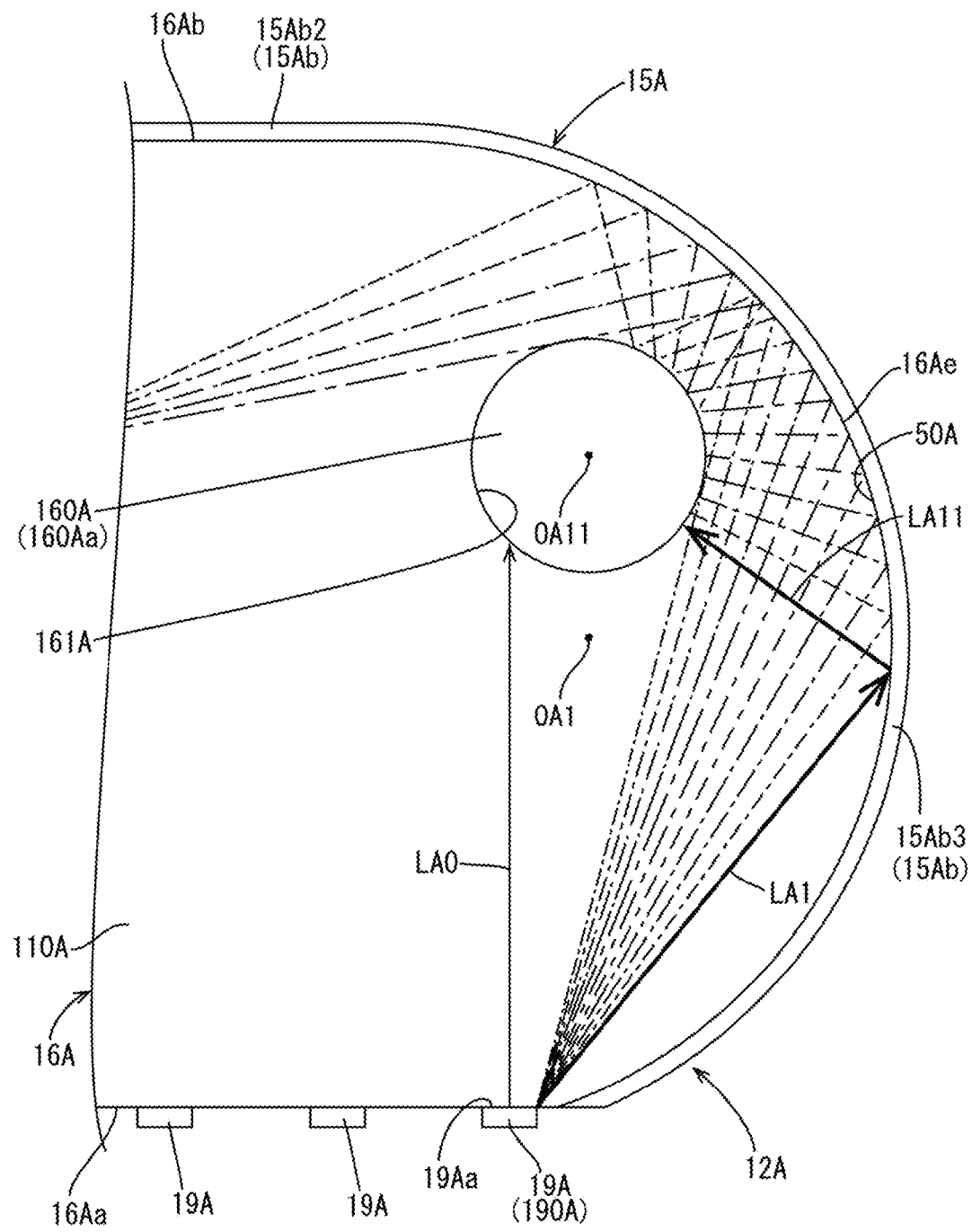
FIG. 8 is a plan view of a part of the lighting device 12A of a second embodiment illustrating that light emitted by a LED opposite a non-light exit portion travels within the light guide plate.

FIG. 8 is a plan view of a part of the lighting device 12A of the second embodiment illustrating that light emitted by a LED 190A opposite a non-light exit portion 190Aa travels within the light guide plate 16A. FIG. 9 is a view typically illustrating a brightness distribution of light exiting the lighting device 12A of the second embodiment.

In the lighting device 12A, a hole 160A that is the non-light exit portion 160Aa is formed in the light guide plate 16A closer to an edge surface 16Ab than that of the first embodiment. The edge surface 16Ab is on an opposite side from the light entrance surface 16Aa. A center OA11 of the circular hole 160A is closer to the edge surface 16Ab than a center position OA1 of the short side of the light guide plate 16A (with respect to an optical axis LA0 direction of a LED 190A). The configurations of the lighting device 12A other than the above configuration are similar to those of the first embodiment.

In the lighting device 12A, among the LEDs 19A arranged in a line, a rightmost LED 190A has an optical axis LA0 that overlaps the non-light exit portion 160Pa similarly to the first embodiment.

Further, the LED 190A is positioned with respect to the non-light exit portion 160Aa as follows. Among the rays of light emitted by the LED 190A through the light emitting surface 19Aa, a rightmost (on a side edge surface 16Ae side, on a third peripheral wall portion 15Ab3 side) one LA1 of the rays with respect to the optical axis LA0 (maximum inclination light) travels within the light guide plate 16A toward the right side edge surface (a light receiving surface) 16Ae of the light guide plate 16A. The light LA1 reflects off an inner wall surface (a reflection portion) 50A of the third peripheral wall portion 15Ab3 of the chassis 15A that is disposed outside the side edge surface 16Ae. The reflected light L11 travels toward the non-light exit portion 160Aa. In FIG. 8, the light emitted by the LED 190A is typically illustrated by dot-and-dash lines.

The position of the LED 190A is determined as described above, and the light emitted by the LED 190A is likely to reach the portion of the light guide plate 16A opposite from the LED 190A with respect to the non-light exit portion 160Aa of the light guide plate 16A overlapping a non-display area 112A. With the configuration where the optical axis LA0 of the light from the LED 190A, the emission direction of the maximum inclination light LA1, and the positions of the non-light exit portion 160Aa and the inner wall surface (the reflecting portion) 50A are set as described above, the light from the LED 190A travels as follows. Among the rays of light emitted by the LED 190A, the rays of light between the optical axis LA0 and the maximum inclination light LA1 travel toward the inner wall surface 50A of the third peripheral wall portion 15Ab3 and reflect off the inner wall surface 50A (the reflecting portion). Thus, the reflected light is likely to reach the portion of the light guide plate 16A opposite from the LED 190A with respect to the non-light exit portion 160Aa.

In the present embodiment, among the rays of light between the optical axis LA0 and the maximum inclination light LA1, the light reflecting off the inner peripheral wall surface 50A travels toward the non-light exit portion 160Aa and reflects off the inner peripheral surface 161A of the non-light exit portion 160Aa and other components (not illustrated) mounted within the non-light exit portion 160Aa. Thus, the reflected light reaches the portion of the light guide plate 16A opposite from the LED 190A with respect to the non-light exit portion 160Aa. In the present embodiment, the reflected light LA11 of the maximum inclination light LA1 travels toward the non-light exit portion 160Aa and reflects off the non-light exit portion 160Aa. Then, the reflected light travels again toward the right side edge surface (the light receiving surface) 16Ae of the light guide plate 16A and the inner wall surface 50A of the third peripheral wall portion 15Ab3.

Figure 9:
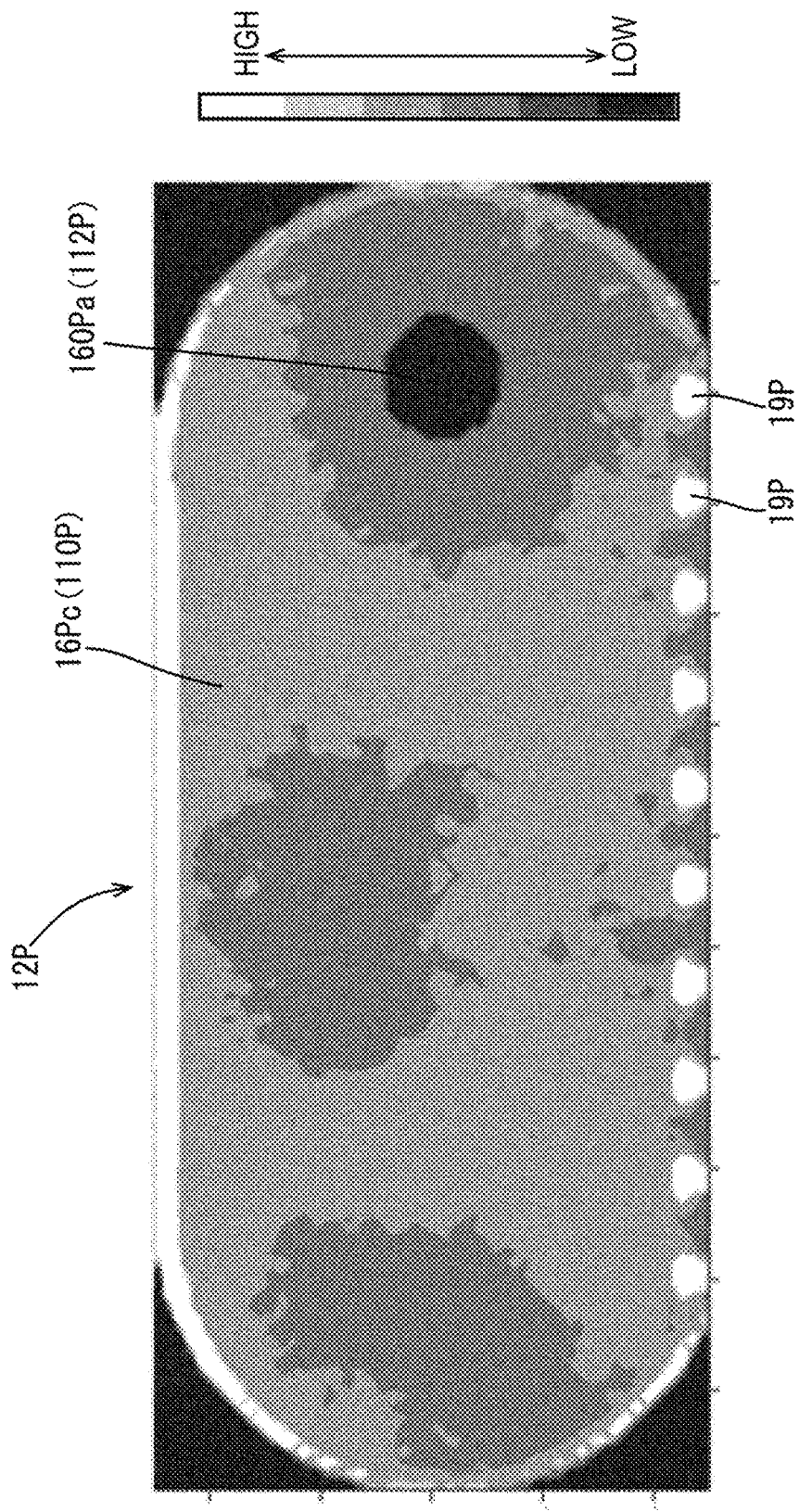
FIG. 9 is a view typically illustrating a brightness distribution of light exiting the lighting device 12A of the second embodiment.

As a result, as illustrated in FIG. 9, a dark portion is less likely to be generated on a light exit surface 16Ac of the lighting device 12A corresponding to the portion of the light guide plate 16A opposite from the LED 190A with respect to the non-light exit portion 160Aa, and unevenness in brightness is likely to occur in the exit light. In the lighting device 12A of the present embodiment, unevenness in brightness is further less likely to occur than that of the first embodiment.

<Third Embodiment>

Next, a lighting device 12B of a third embodiment will be described with reference to FIGS. 10 and 11. In the lighting device 12B of the third embodiment, same symbols or numbers as the first embodiment are applied to parts same as those in the first embodiment and "B" is further added thereto.

Figure 10:
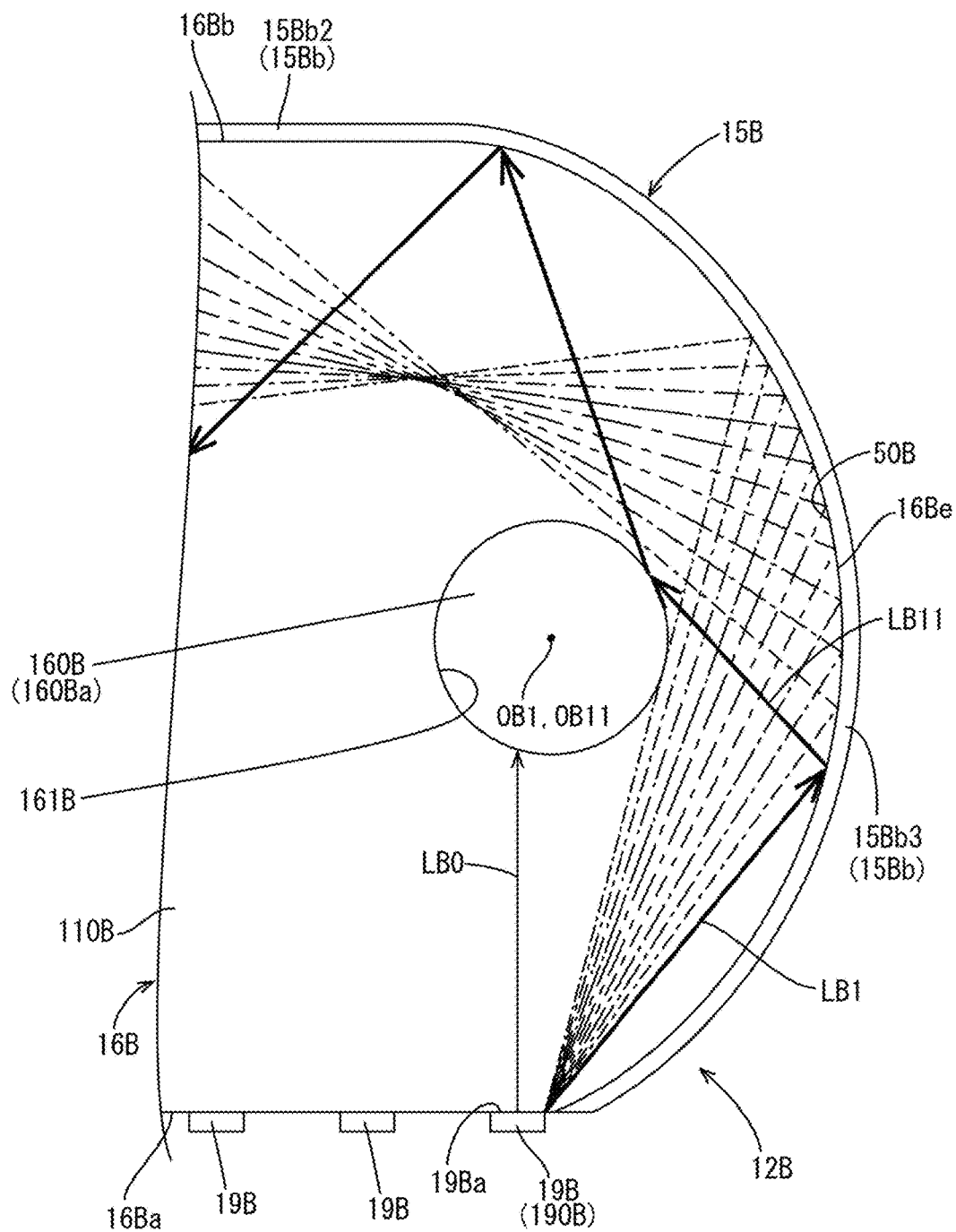
FIG. 10 is a plan view of a part of a lighting device of a third embodiment illustrating that light emitted by a LED opposite a non-light exit portion travels within the light guide plate.

FIG. 10 is a plan view of a part of a lighting device 16B of a third embodiment illustrating that light emitted by a LED 190B opposite a non-light exit portion 160Ba travels within a light guide plate 160B. FIG. 11 is a view typically illustrating a brightness distribution of light exiting the lighting device 12B of the third embodiment.

In the lighting device 12B, a hole 160B that is the non-light exit portion 160Ba is formed in the light guide plate 16B closer to the light entrance surface 16Aa than that of the first embodiment. In the present embodiment, a center OB11 of the circular hole 160B coincides with a center position OB1 of the short side of the light guide plate 16B (with respect to the optical axis LB0 direction of the LED 190B).

In the lighting device 12B, the light guide plate 16B has an arc shape of an ellipsoidal shape at two side edge surfaces and the arc shape has a curvature smaller than that of the light guide plate 16 of the first embodiment. The light guide plate 16A has a long-side dimension (a longest dimension) and a short-side dimension same as those of the first embodiment. A peripheral wall portion 15Bb of a chassis 15B (such as a third peripheral wall portion 15Bb3), a bottom portion of the chassis 15B, the optical sheet, the reflection sheet, and the liquid crystal panel have a shape following the shape of the light guide plate 16A (having the edge portions of an elliptical arc shape). Other configurations of the lighting device 12B are similar to those of the first embodiment.

In the lighting device 12B, among the LEDs 19B arranged along the long side of a light entrance surface 16Ba of the light guide plate 16B, a rightmost LED 190B has an optical axis LB0 that overlaps the non-light exit portion 160Ba similarly to the first embodiment.

Further, the LED 190B is positioned with respect to the non-light exit portion 160Ba as follows. Among the rays of light emitted by the LED 190B through the light emitting surface 19Ba, a rightmost (on a side edge surface 16Be side, on a third peripheral wall portion 15Bb3 side) one LB1 of the rays with respect to the optical axis LB0 (maximum inclination light) travels within the light guide plate 16B toward the right side edge surface (a light receiving surface) 16Be of the light guide plate 16B. The light LB1 reflects off an inner wall surface (a reflection portion) 50B of the third peripheral wall portion 15Bb3 of the chassis 15B that is disposed outside the side edge surface 16Be. The reflected light LB11 travels toward the non-light exit portion 160Ba. In FIG. 10, the light emitted by the LED 190B is typically illustrated by dot-and-dash lines.

The position of the LED 190B is determined as described above, and the light emitted by the LED 190B is likely to reach the portion of the light guide plate 16B opposite from the LED 190B with respect to the non-light exit portion 160Ba of the light guide plate 16B overlapping a non-display area 112B. With the configuration where the optical axis LB0 of the light from the LED 190A, the emission direction of the maximum inclination light LB1, and the positions of the non-light exit portion 160Ba and the inner wall surface (the reflecting portion) 50B are set as described above, the light from the LED 190B travels as follows. Among the rays of light emitted by the LED 190B, the rays of light between the optical axis LB0 and the maximum inclination light LB1 travel toward the inner wall surface 50B of the third peripheral wall portion 15Bb3 and reflect off the inner wall surface 50B (the reflecting portion). Thus, the reflected light is likely to reach the portion of the light guide plate 16B opposite from the LED 190B with respect to the non-light exit portion 160Ba.

Figure 11:
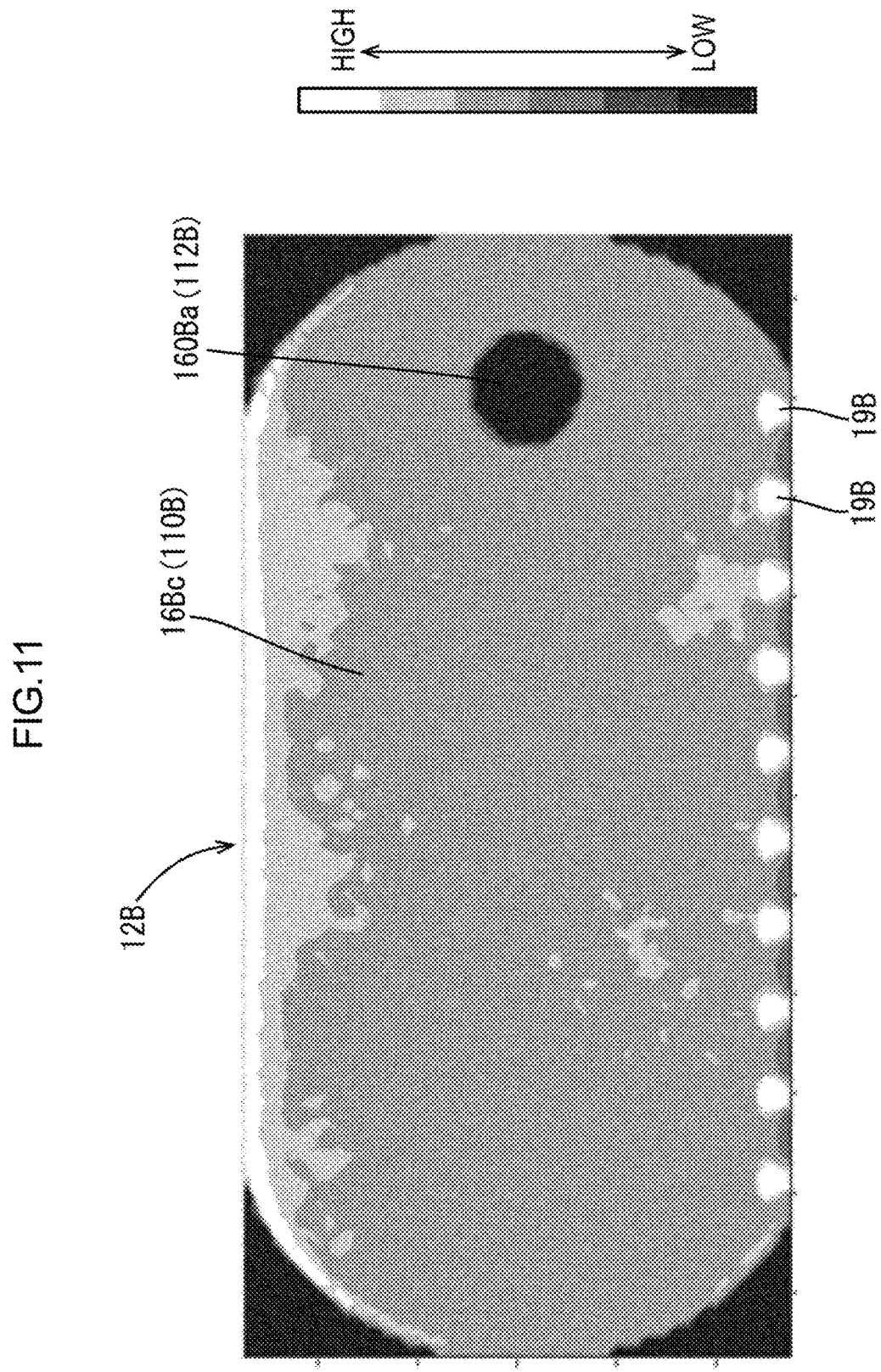
FIG. 11 is a view typically illustrating a brightness distribution of light exiting the lighting device of the third embodiment.

As a result, as illustrated in FIG. 11, a dark portion is less likely to be generated on a light exit surface 16Bc of the lighting device 12B corresponding to the portion of the light guide plate 16B opposite from the LED 190B with respect to the non-light exit portion 160Ba, and unevenness in brightness is likely to occur in the exit light. In the lighting device 12B of the present embodiment, although brightness is lower than that of the first embodiment as a whole, the light evenly reaches the vicinity of the non-light exit portion 160Ba. Therefore, a dark portion (corresponding to the portion opposite from the LED 190B with respect to the non-light exit portion 160Ba) is less likely to be generated.

<Fourth Embodiment>

Next, a lighting device 12C of a fourth embodiment will be described with reference to FIGS. 12 and 13. In the lighting device 12C of the fourth embodiment, same symbols or numbers as the first embodiment are applied to parts same as those in the first embodiment and "C" is further added thereto.

Figure 12:
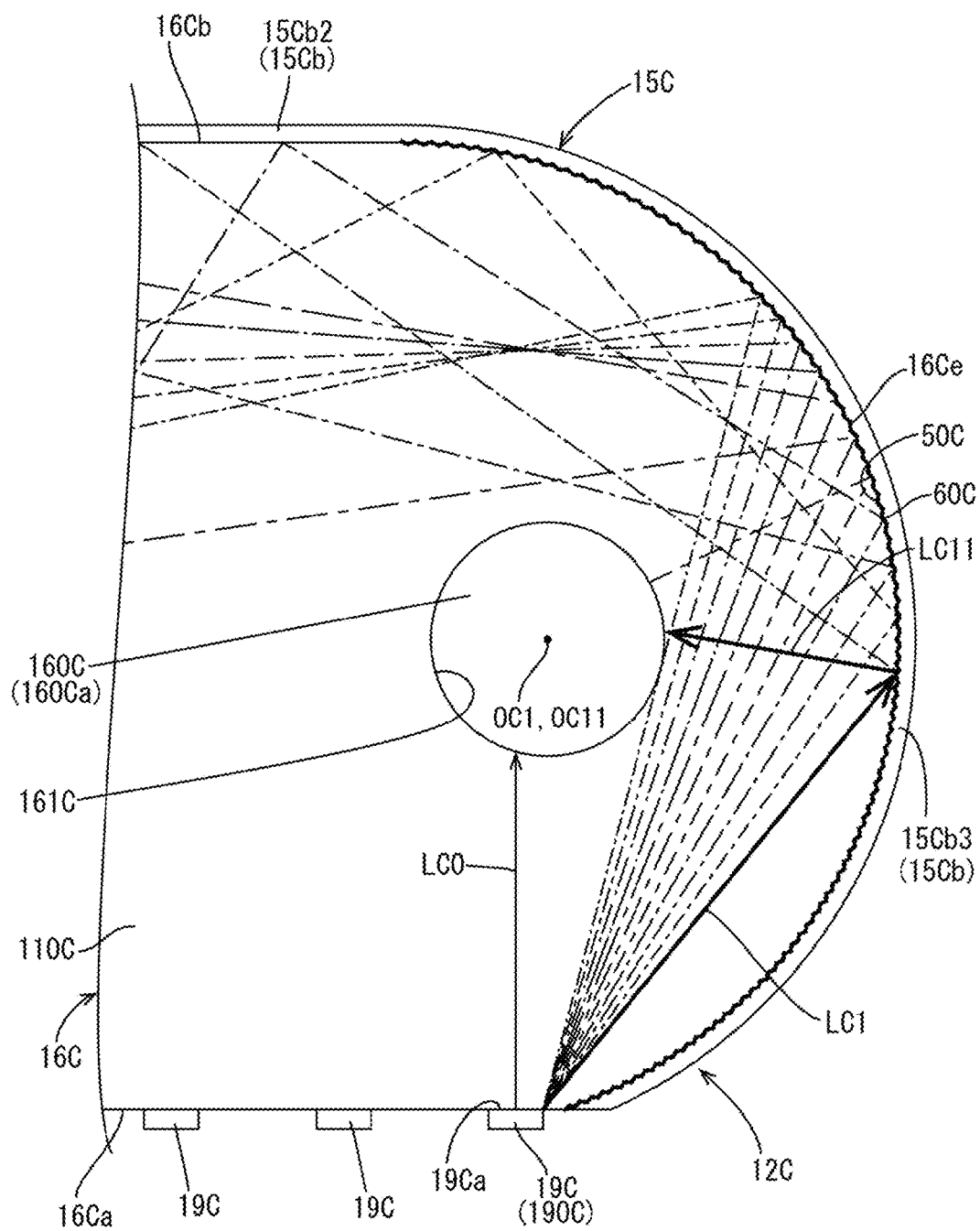
FIG. 12 is a plan view of a part of a lighting device of a fourth embodiment illustrating that light emitted by a LED opposite a non-light exit portion travels within the light guide plate.

FIG. 12 is a plan view of a part of the lighting device 12C of the fourth embodiment illustrating that light emitted by a LED 190C opposite a non-light exit portion 160Ca travels within the light guide plate 16C. FIG. 13 is an enlarged view illustrating a side edge surface (a light receiving surface) 16Ce of a light guide plate 16C of the fourth embodiment.

In the lighting device 12C, a hole 160C that is the non-light exit portion 160Ca is formed in the light guide plate 16C closer to the light entrance surface 16Ca than that of the first embodiment. In the present embodiment, a center OC11 of the circular hole 160C coincides with a center position OC1 of the short side of the light guide plate 16C (with respect to the optical axis LC0 direction of the LED 190C).

Figure 13:
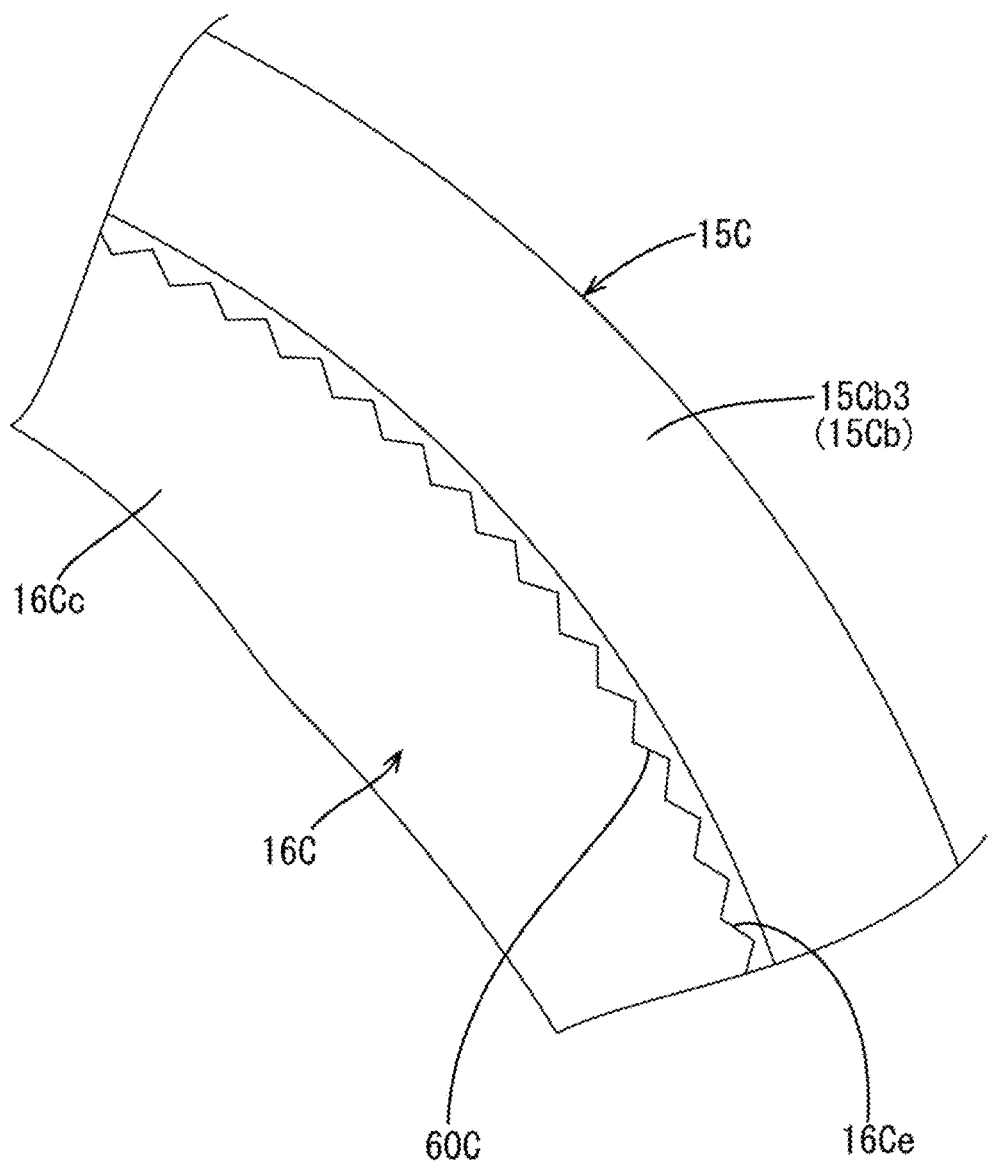
FIG. 13 is an enlarged view illustrating a side edge surface (a light receiving surface) of a light guide plate of the fourth embodiment.

In the lighting device 12C, as illustrated in FIG. 13, the light guide plate 16C has the right side edge surface (the light receiving surface) 16Ce and the right side edge surface 16Ce has fine prism portions (an example of a light path adjusting portion) 60C. The chassis 15C is arranged such that an inner wall surface 50C of the third peripheral wall portion 15Cb covers the prism portions 60C from an outer side. Other configurations of the lighting device 12C are same as those of the first embodiment.

In the lighting device 12C, among the LEDs 19C arranged along the long side of a light entrance surface 16Ca of the light guide plate 16C, a rightmost LED 190C has an optical axis LC0 that overlaps the non-light exit portion 160Ca similarly to the first embodiment.

Further, the LED 190C is positioned with respect to the non-light exit portion 160Ca as follows. Among the rays of light emitted by the LED 190C through the light emitting surface 19Ba, a rightmost (on a side edge surface 16Ce side, on a third peripheral wall portion 15Cb3 side) one LC1 of the rays with respect to the optical axis LC0 (maximum inclination light) travels within the light guide plate 16C toward the prism portions 60C of the right side edge surface (the light receiving surface) 16Ce of the light guide plate 16C. The light LC1 is reflected or refracted by an inner wall surface (a reflection portion) 50C of the third peripheral wall portion 15Cb3 of the chassis 15C that is disposed outside the side edge surface 16Ce and the prism portions 60C. The reflected or refracted light LC11 travels toward the non-light exit portion 160Ca. The rays of reflected light LC11 in this specification includes the rays of light reflected by the prism portions 60 and also include the rays of light refracted by the prism portions 60. In the present embodiment, the reflected light LC11 of the maximum inclination light LC1 travels toward the non-light exit portion 160Ca by the prism portions 60C formed on the side edge surface (the light receiving surface) of the light guide plate 16C. In FIG. 12, the light emitted by the LED 190C is typically illustrated by dot-and-dash lines.

The position of the LED 190C is determined as described above, and the light emitted by the LED 190C is likely to reach the portion of the light guide plate 16C opposite from the LED 190C with respect to the non-light exit portion 160Ca of the light guide plate 16C overlapping a non-display area 112C. With the configuration where the optical axis LC0 of the light from the LED 190C, the emission direction of the maximum inclination light LC1, and the positions of the non-light exit portion 160Ca and the inner wall surface (the reflecting portion) 50C are set as described above, the light from the LED 190C travels as follows. Among the rays of light emitted by the LED 190C, the rays of light between the optical axis LC0 and the maximum inclination light LC1 travel toward the prism portions 60C formed on the side edge surface (the light receiving surface) 16Ce and are reflected or refracted by the prism portions 60 and the inner wall surface (the reflecting portion) 50C. Thus, the reflected or refracted light is likely to reach the portion of the light guide plate 16C opposite from the LED 190C with respect to the non-light exit portion 160Ca.

As a result, a dark portion is less likely to be generated on a light exit surface 16Cc of the lighting device 12C corresponding to the position of the light guide plate 16C opposite from the LED 190C with respect to the non-light exit portion 160Ca, and unevenness in brightness is likely to occur in the exit light.

<Fifth Embodiment>

Next, a lighting device of a fifth embodiment will be described with reference to FIG. 14. In the lighting device of the present embodiment, same symbols or numbers as the first embodiment are applied to parts same as those in the first embodiment and "D" is further added thereto.

Figure 14:
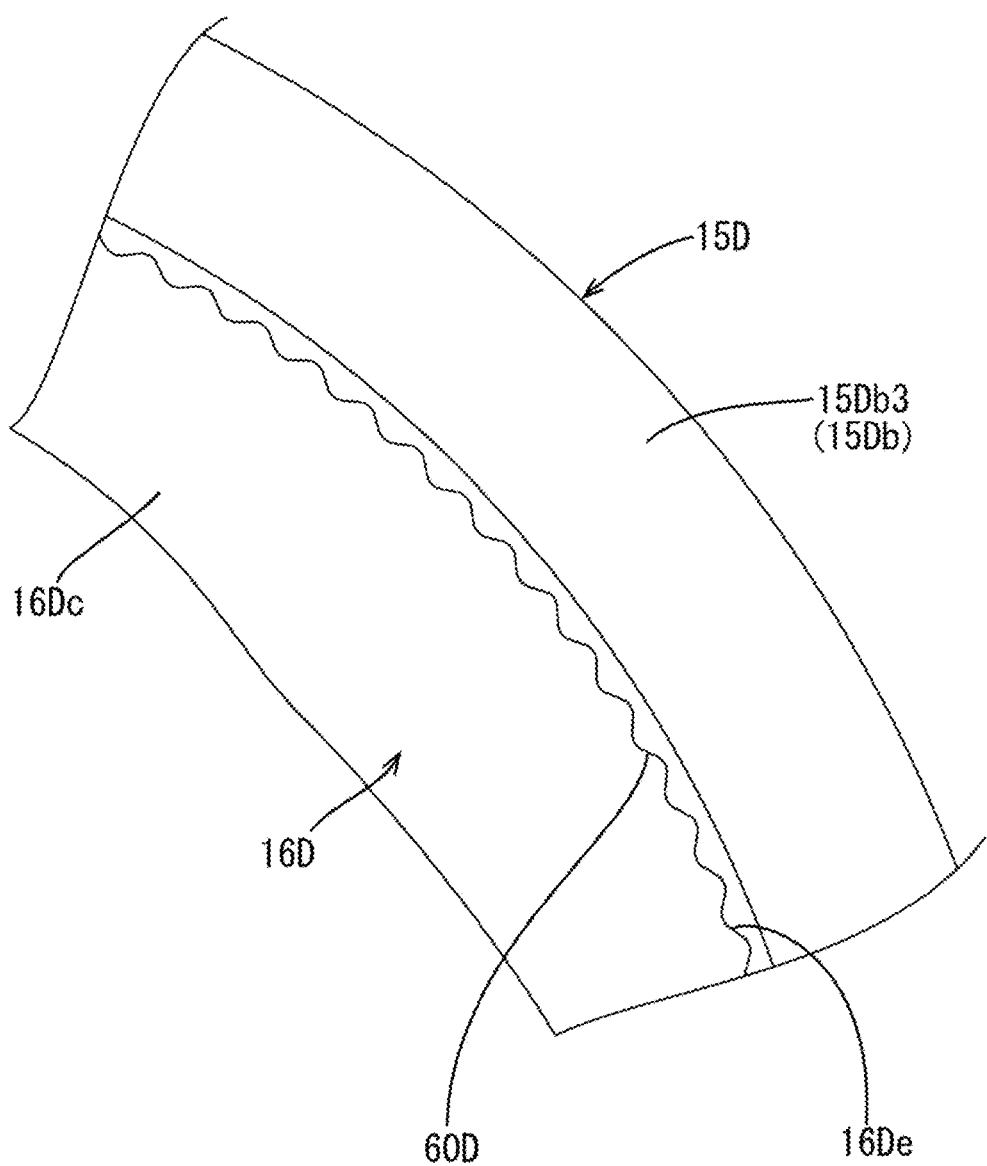
FIG. 14 is an enlarged view illustrating a side edge surface (a light receiving surface) of a light guide plate of a fifth embodiment.

FIG. 14 is an enlarged view illustrating a side edge surface (a light receiving surface) of a light guide plate 16D of the fifth embodiment. The lighting device of the present embodiment includes an uneven portion (an example of the light path adjusting portion) 60D on a side edge surface (the light receiving surface) 16De instead of the prism portions 60C of the fourth embodiment. The uneven portion 60D does not have a plan view triangular shape like the prism portions 60C of the fourth embodiment but has a smooth curved shape. Thus, the uneven portion 60D is formed on the side edge surface 16De of the light guide plate 16D instead of the prism portions 60C. Accordingly, a dark portion is less likely to be generated on a light exit surface 16Dc of the lighting device 12D corresponding to the portion of the light guide plate 16D opposite from the LED 190D with respect to the non-light exit portion 160Ca, and unevenness in brightness is likely to occur in the exit light.

<Sixth Embodiment>

Next, a lighting device 12E of a sixth embodiment will be described with reference to FIG. 15. In the lighting device 12E of the sixth embodiment, same symbols or numbers as the first embodiment are applied to parts same as those in the first embodiment and "E" is further added thereto.

Figure 15:
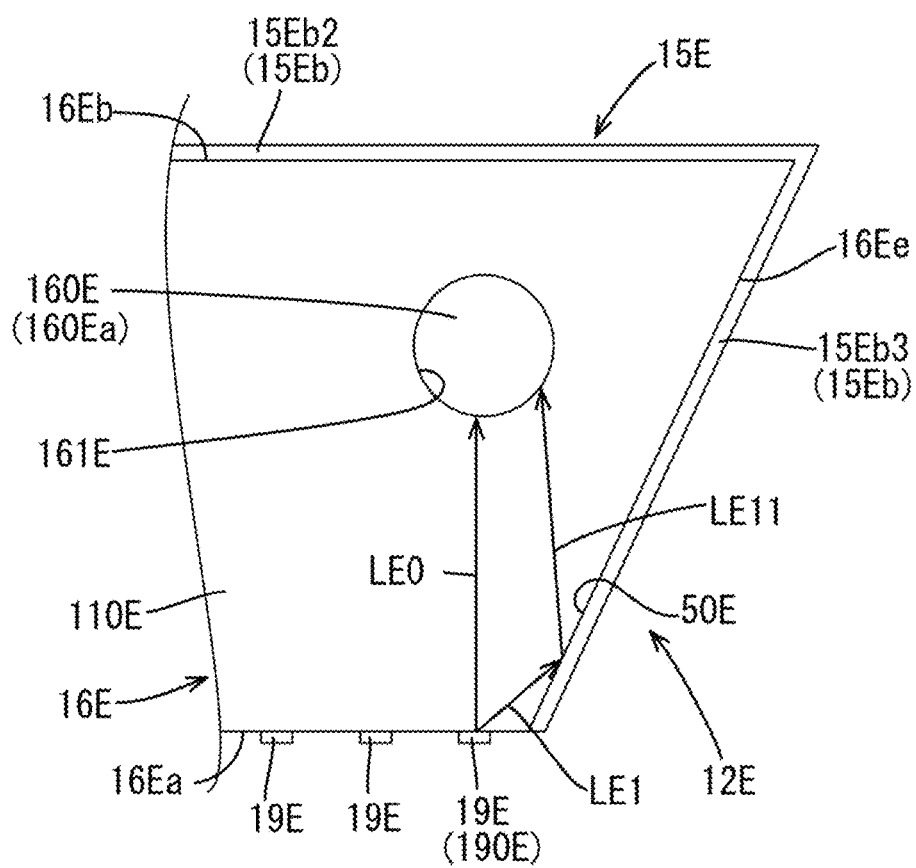
FIG. 15 is a plan view of a part of a lighting device of a sixth embodiment illustrating that light emitted by a LED opposite a non-light exit portion travels within the light guide plate.

FIG. 15 is a plan view of a part of the lighting device of the sixth embodiment illustrating that light emitted by a LED opposite a non-light exit portion 160Ea travels within the light guide plate. In the lighting device 12E of the present embodiment, a light guide plate 16E has two end portions (edge portions near the light entrance surface 16Ea) that are not in an arc shape but in an inclined shape. The light guide plate 16E has a plan view trapezoidal shape and has a light entrance surface 16Ea and an edge surface 16Eb that is on an opposite side from the light entrance surface 16Ea and longer than the light entrance surface 16Ea. The light guide plate 16E has a side edge surface 16Ee that is a flat surface and is inclined to spread from the light entrance surface 16Ea to the edge surface 16Eb.

A chassis 15E, the optical sheet, and the liquid crystal panel have a shape according to the shape of the light guide plate 16E.

In such a lighting device 12E, among the LEDs 19E arranged along the long side of a light entrance surface 16Ea of the light guide plate 16E, a rightmost LED 190E has an optical axis LE0 that overlaps the non-light exit portion 160Ea similarly to the first embodiment.

Further, the LED 190E is positioned with respect to the non-light exit portion 160Ea as follows. Among the rays of light emitted by the LED 190E through the light emitting surface 19Ea, a rightmost (on a side edge surface 16Ee side, on a third peripheral wall portion 15Eb3 side) one LE1 of the rays with respect to the optical axis LE0 (maximum inclination light) travels within the light guide plate 16E toward a right side edge surface (the light receiving surface) 16Ee of the light guide plate 16E. The light LE1 is reflected by an inner wall surface (a reflection portion) 50E of the third peripheral wall portion 15Eb3 of the chassis 15E that is disposed outside the side edge surface 16Ee. The reflected light LE11 travels toward the non-light exit portion 160Ea.

The position of the LED 190E is determined as described above, and the light emitted by the LED 190E is likely to reach the portion of the light guide plate 16E opposite from the LED 190E with respect to the non-light exit portion 160Ea of the light guide plate 16E overlapping a non-display area 112E. With the configuration where the optical axis LE0 of the light from the LED 190E, the emission direction of the maximum inclination light LE1, and the positions of the non-light exit portion 160Ea and the inner wall surface (the reflecting portion) 50E are set as described above, the light from the LED 190E travels as follows. Among the rays of light emitted by the LED 190E, the rays of light between the optical axis LE0 and the maximum inclination light LE1 travel toward the inner wall surface 50E of the third peripheral wall portion 15Eb3 and are reflected by the inner wall surface (the reflecting portion) 50E. Thus, the reflected light is likely to reach the portion of the light guide plate 16E opposite from the LED 190E with respect to the non-light exit portion 160Ea.

As a result, a dark portion is less likely to be generated on a light exit surface 16Ec of the lighting device 12E corresponding to the portion of the light guide plate 16E opposite from the LED 190E with respect to the non-light exit portion 160Ea, and unevenness in brightness is likely to occur in the exit light.

<Seventh Embodiment>

Next, a lighting device 12F of a seventh embodiment will be described with reference to FIG. 16. In the lighting device 12F of the seventh embodiment, same symbols or numbers as the first embodiment are applied to parts same as those in the first embodiment and "F" is further added thereto.

Figure 16:
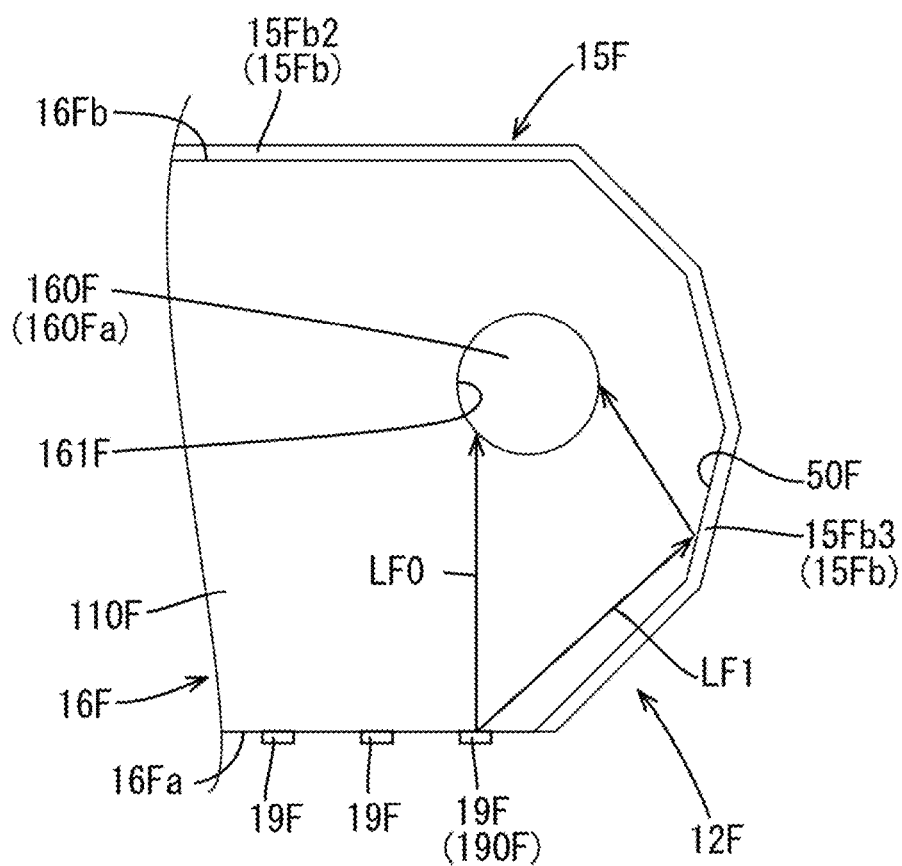
FIG. 16 is a plan view of a part of a lighting device of a seventh embodiment illustrating that light emitted by a LED opposite a non-light exit portion travels within the light guide plate.

FIG. 16 is a plan view of a part of a lighting device of the seventh embodiment illustrating that light emitted by a LED opposite a non-light exit portion 160Fa travels within the light guide plate. In the lighting device 12F of the present embodiment, the light guide plate 16F has two end portions (end portions near the light entrance surface 16Fa) that are not formed in an arc but in a polygonal shape (chamfered shape). The light guide plate 16F has a side edge surface 16Fe including four surface portions.

A chassis 15Fe, the optical sheet, and the liquid crystal panel have a shape following the shape of the light guide plate 16F.

In the lighting device 12F, among the LEDs 19F arranged along the long side of a light entrance surface 16Fa of the light guide plate 16F, a rightmost LED 190F has an optical axis LF0 that overlaps the non-light exit portion 160Fa similarly to the first embodiment.

Further, the LED 190F is positioned with respect to the non-light exit portion 160Fa as follows. Among the rays of light emitted by the LED 190F through the light emitting surface 19Fa, a rightmost (on a side edge surface 16Fe side, on a third peripheral wall portion 15Fb3 side) one LF1 of the rays with respect to the optical axis LF0 (maximum inclination light) travels within the light guide plate 16F toward the right side edge surface (the light receiving surface) 16Fe of the light guide plate 16F. The light LF1 reflects off an inner wall surface (the reflection portion) 50F of the third peripheral wall portion 15Fb3 of the chassis 15F that is disposed outside the side edge surface 16Fe. The reflected light LF11 travels toward the non-light exit portion 160Fa.

The position of the LED 190F is determined as described above, and the light emitted by the LED 190F is likely to reach the portion of the light guide plate 16F opposite from the LED 190F with respect to the non-light exit portion 160Fa of the light guide plate 16F overlapping a non-display area 112F. With the configuration where the optical axis LF0 of the light from the LED 190F, the emission direction of the maximum inclination light LF1, and the positions of the non-light exit portion 160Fa and the inner wall surface (the reflecting portion) 50F are set as described above, the light from the LED 190F travels as follows. Among the rays of light emitted by the LED 190F, the rays of light between the optical axis LF0 and the maximum inclination light LF1 travel toward the inner wall surface 50F of the third peripheral wall portion 15Fb3 and is reflected by the inner wall surface (the reflecting portion) 50F. Thus, the reflected light is likely to reach the portion of the light guide plate 16F opposite from the LED 190F with respect to the non-light exit portion 160Fa.

As a result, a dark portion is less likely to be generated on a light exit surface 16Fc of the lighting device 12f corresponding to the position of the light guide plate 16F opposite from the LED 190F with respect to the non-light exit portion 160Fa, and unevenness in brightness is likely to occur in the exit light.

<Eighth Embodiment>

Figure 17:
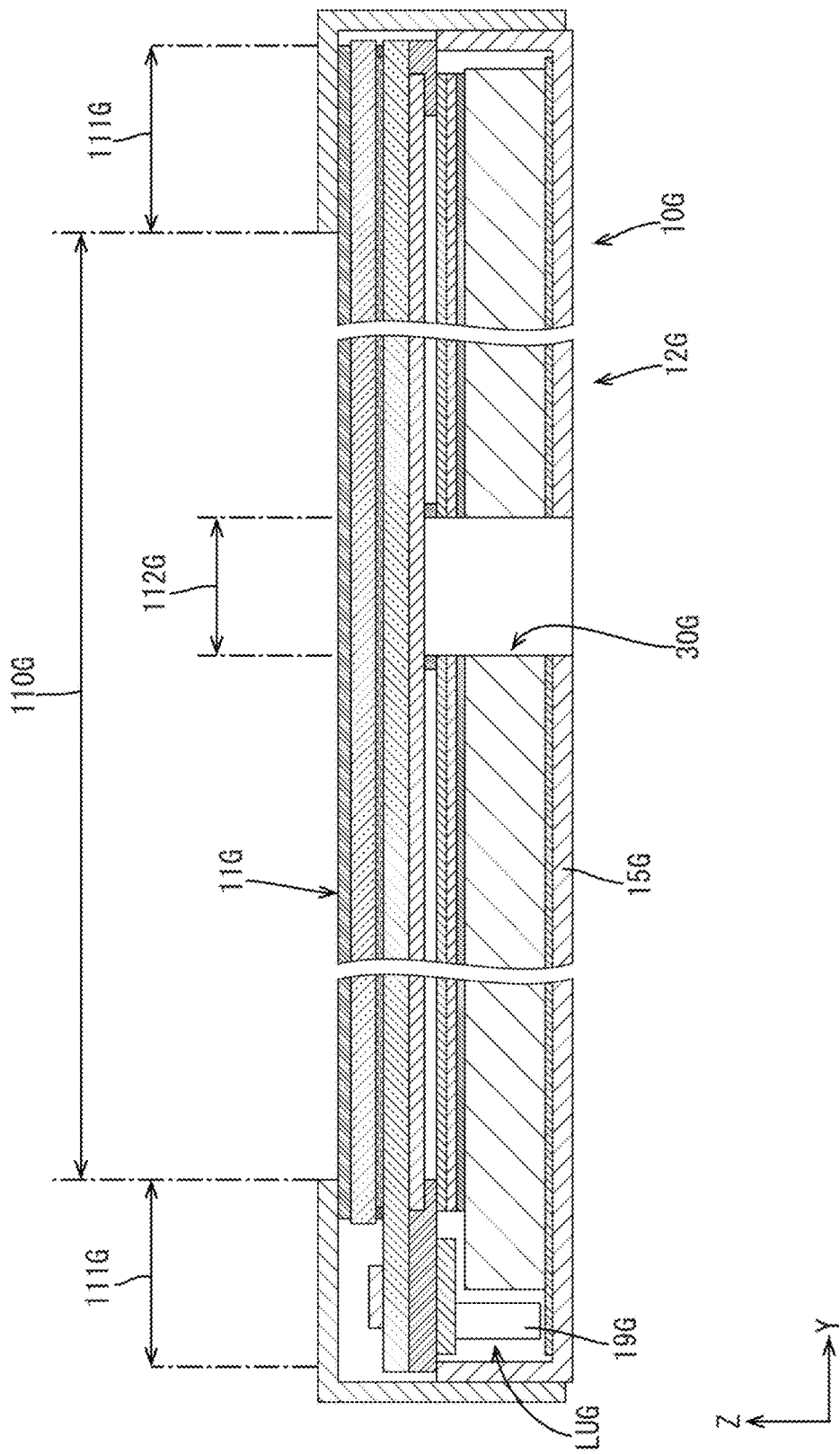
FIG. 17 is a cross-sectional view of a liquid crystal display device of an eighth embodiment.

Next, a liquid crystal display device 10G of an eighth embodiment will be described with reference to FIG. 17. In the liquid crystal display device 10G of the eighth embodiment, same symbols or numbers as the first embodiment are applied to parts same as those in the first embodiment and "G" is further added thereto. FIG. 17 is a cross-sectional view of the liquid crystal display device 10G of the eighth embodiment. The liquid crystal display device 10G also includes a hole 30G corresponding to a second non-display area 112G. In the present embodiment, a liquid crystal panel 11G does not include a panel hole corresponding to the second non-display area 112G but only the lighting device 12G has the hole 30G. The present invention may be applied to the liquid crystal display device 10G and the lighting device 12G including the hole 30G.

<Ninth Embodiment>

Figure 18:
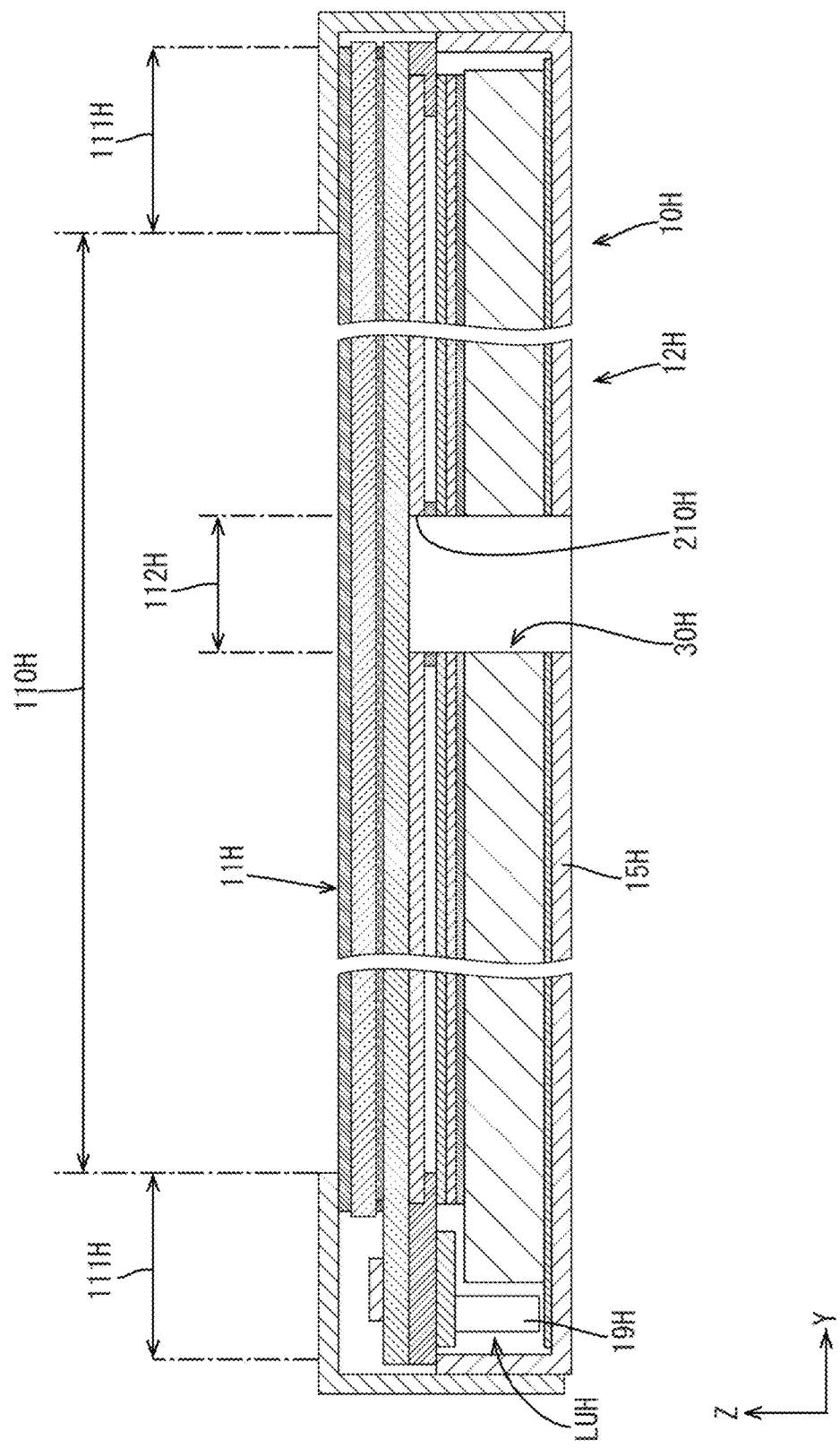
FIG. 18 is a cross-sectional view of a liquid crystal display device of a ninth embodiment.

Next, a liquid crystal display device 10H of a ninth embodiment will be described with reference to FIG. 18. In the liquid crystal display device 10H of the ninth embodiment, same symbols or numbers as the first embodiment are applied to parts same as those in the first embodiment and "H" is further added thereto. FIG. 18 is a cross-sectional view of the liquid crystal display device 10H of the ninth embodiment. The liquid crystal display device 10H also includes a hole 30H corresponding to a second non-display area 112H. A liquid crystal panel 11H also includes a panel hole 210H that configures the hole 30H. In the present embodiment, the panel hole 210H is formed only in a polarizing plate 11Hf on a rear-surface side of the liquid crystal panel 11H. The present invention may be applied to the liquid crystal display device 10H and the lighting device 12H including the hole 30H.

<Tenth Embodiment>

Next, a liquid crystal display device 10I of a tenth embodiment will be described with reference to FIG. 19. In the liquid crystal display device 10I of the tenth embodiment, same symbols or numbers as the first embodiment are applied to parts same as those in the first embodiment and "I" is further added thereto. FIG. 19 is a cross-sectional view of the liquid crystal display device 10I of the tenth embodiment.

The liquid crystal display device 10I also includes a hole 30I corresponding to a second non-display area 112I. A liquid crystal panel 11I also includes a panel hole 210I that configures the hole 30I. In the present embodiment, the panel hole 210I is formed through the liquid crystal panel 11I besides a front-side polarizing plate 11He. The present invention may be applied to the liquid crystal display device 10I and the lighting device 12I including the hole 30H.

<Other Embodiments>

The present invention is not limited to the embodiments, which have been described using the foregoing descriptions and the drawings. For example, embodiments described below are also included in the technical scope of the present invention.

(1) In each of the above embodiments, the reflecting portion is the inner wall surface of the peripheral wall portion of the chassis. The present invention may not be limited thereto. In another embodiment, the reflecting portion may be an exclusive reflecting member that is disposed between a side edge surface (the light receiving surface) of the light guide plate and a peripheral wall portion of a chassis and covers the side edge surface (the light receiving surface), or may be a reflecting film of resin having reflectivity (white resin) that is formed integrally with the side edge surface (the light receiving surface) on an outer side, or may be an extended portion that is extended from the edge portion of the reflection sheet.

(2) In each of the above embodiments, the reflecting portion is the chassis made of metal. In another embodiment, the reflecting portion may not be made of metal but may be made of resin having good reflectivity.

(3) In each of the above embodiments, the light guide plate include one non-light exit portion (corresponding to the second non-display area of the liquid crystal panel). In another embodiment, two or more non-light exit portions may be included as long as the object of the present invention can be achieved.

(4) In the above embodiments, the display device is a part of the instrumental panel of a vehicle. The present invention may not be limited thereto and may be applied to display devices such as smartphones and tablet computers.

(5) In the above embodiments, the liquid crystal display device including the liquid crystal panel as the display panel is used. The present invention may be applied to display devices including other type of display panel.

(6) The above embodiments include the TFTs as switching components of the liquid crystal display device. However, switching components other than the TFTs (such as thin film diodes (TFDs)) may be included in the scope of the present invention. Furthermore, a liquid crystal display device configured to display black and white images other than o the liquid crystal display device configured to display color images.

(7) In the third embodiment, the light guide plate includes the side edge surface (the light receiving surface) that has an elliptical arc shape, and the short-side dimension of the light guide plate is same as that of the first embodiment. In another embodiment, the short-side dimension of the light guide plate may be varied (for example longer than that of the first embodiment).

EXPLANATION OF SYMBOLS

10: liquid crystal display device (display device), 11: liquid crystal panel (display panel), 110: display area, 111: first non-display area, 112: second non-display area, 12: lighting device, 13: bezel, 15: chassis, 15*a*: bottom portion, 15b: peripheral wall portion, 15b3: third peripheral wall portion, 50: inner wall surface (reflecting portion), 16: light guide plate, 16a: light entrance surface, 16c: light exit surface, 16e: side edge surface (light receiving surface), 160: hole, 160a: non-light exit portion, 17: optical sheet, 18: reflecting sheet, 19] LED (light source), 190: LED (light source) closest to non-light exit portion, L0: optical axis, L1: maximum inclination light, L11: reflected light of maximum inclination light, LU: LED unit

The invention claimed is:

1. A lighting device comprising:
   a light source emitting light having an orientation distribution around an optical axis;
   a light guide plate that is a transparent plate member having a hole being through thickness thereof, the light guide plate including a light entrance surface, a light exit surface, a non-light exit portion, and a light receiving surface,
      the light entrance surface being an edge surface of the plate member and opposite the light source such that the optical axis and the hole intersect at some point, and the light entrance surface through which light emitted by the light source enters the light guide plate,
      the light exit surface being a front-side plate surface of the plate member and through which the light entering through the light entrance surface exiting the light guide plate,
      the non-light exit portion that is the hole and surrounded by the light exit surface, and
      the light receiving surface being a side edge surface of the plate member that is next to the light entrance surface and near the non-light exit portion, the light receiving surface receiving maximum inclination light including light that is inclined at a largest angle with respect to the optical axis in a plan view among rays of light emitted by the light source; and
   a reflecting portion arranged opposite the light receiving surface and reflecting the maximum inclination light from the light receiving surface toward the non-light exit portion, wherein
      among rays of light between the optical axis and the maximum inclination light, light reflecting off the reflecting portion and traveling toward the non-light exit portion reflects off the non-light exit portion and travels again toward the reflecting portion.

2. The lighting device according to claim 1, wherein
   the light receiving surface is a curved surface of an arc or an elliptical arc that expands outward, and
   the reflecting portion has a curved surface following the light receiving surface.

3. The lighting device according to claim 1, wherein
   the hole that is the non-light exit portion has a center, and
   the center of the hole coincides with a center of the light guide plate with respect to a direction of the optical axis of the light source, or the center of the hole is away from the light entrance surface with respect to the center of the light guide plate.

4. The lighting device according to claim 1, wherein the light receiving surface has a light path adjusting portion that reflects the maximum inclination light emitted by the light source toward the non-light exit portion.

5. The lighting device according to claim 1, further comprising:
   a chassis including a bottom portion where the light guide plate is arranged, and a peripheral wall portion extending from an outer peripheral edge portion of the bottom portion toward a front side and surrounding the light guide plate, wherein
   the reflecting portion is the peripheral wall portion.

6. The lighting device according to claim 1, wherein
   the light receiving surface is a flat surface inclined with respect to the light entrance surface, and
   the reflecting portion is a flat surface along the light receiving surface.

7. A display device comprising:
   the lighting device according to claim 1; and
   a display panel arranged on a light exit side of the lighting device and including a display area displaying images using light from the lighting device and a non-display area where no image is displayed and that is disposed in the display area.

* * * * *